(12) United States Patent
Nagarajan et al.

(10) Patent No.: US 8,219,499 B2
(45) Date of Patent: Jul. 10, 2012

(54) COMMUNITY HUB REVIEW

(75) Inventors: Srinath Nagarajan, Waltham, MA (US);
Timothy James Mark, Berkeley, CA (US); Kerry Cantley, Fort Mill, SC (US); David Joa, Irvine, CA (US); Kurt D. Newman, Matthews, NC (US)

(73) Assignee: Bank of America Corporation, Charlotte, NC (US)

( * ) Notice: Subject to any disclaimer, the term of this patent is extended or adjusted under 35 U.S.C. 154(b) by 294 days.

(21) Appl. No.: 12/713,638

(22) Filed: Feb. 26, 2010

(65) Prior Publication Data

US 2011/0213724 A1    Sep. 1, 2011

(51) Int. Cl.
*G06Q 99/00* (2006.01)

(52) U.S. Cl. ........................................................ 705/319
(58) Field of Classification Search .................. None
See application file for complete search history.

(56) References Cited

U.S. PATENT DOCUMENTS

| | | | |
|---|---|---|---|
| 6,847,969 B1* | 1/2005 | Mathai et al. ........................ 1/1 |
| 2005/0004837 A1* | 1/2005 | Sweeney et al. ................. 705/14 |
| 2006/0178918 A1* | 8/2006 | Mikurak ........................... 705/7 |
| 2007/0106627 A1* | 5/2007 | Srivastava et al. ............. 706/20 |
| 2007/0233736 A1* | 10/2007 | Xiong et al. ................ 707/104.1 |
| 2007/0245002 A1* | 10/2007 | Nguyen et al. ................ 709/223 |
| 2008/0140566 A1* | 6/2008 | Chowins .......................... 705/39 |
| 2009/0132311 A1* | 5/2009 | Klinger et al. ..................... 705/7 |
| 2009/0157693 A1* | 6/2009 | Palahnuk ........................ 707/10 |
| 2009/0216577 A1* | 8/2009 | Killebrew ......................... 705/7 |
| 2009/0292595 A1* | 11/2009 | Tonnison et al. ............... 705/11 |
| 2011/0054978 A1* | 3/2011 | Mohil .............................. 705/9 |

OTHER PUBLICATIONS

U.S. Appl. No. 12/713,624, filed Feb. 26, 2010.
U.S. Appl. No. 12/713,632, filed Feb. 26, 2010.
U.S. Appl. No. 12/713,899, filed Feb. 26, 2010.
U.S. Appl. No. 12/714,101, filed Feb. 26, 2010.

* cited by examiner

*Primary Examiner* — Jonathan Ouellette
(74) *Attorney, Agent, or Firm* — Michael A. Springs; Moore & Van Allen PLLC; Andrew D. Gerschutz

(57) ABSTRACT

The business review application provides a customer with a bank-hosted business review platform that provides an advertising and feedback service for the bank's business customers and provides a rating, review, feedback, and recommendation service for the bank's individual and business customers. Thus, the bank's customers can rate and review the bank's business customers. The bank uses its authentication systems used by its customers to access online banking services to authenticate the identity of the customer creating a business review in the business review platform. In some embodiments, the business review application only permits its customers to make one review of a business within a certain period of time or one review after a transaction with that business shows up in the customer's transaction information maintained by the bank. In this way, the bank can host a review platform that is much more accurate and trust-worthy than traditional business review platforms.

27 Claims, 18 Drawing Sheets

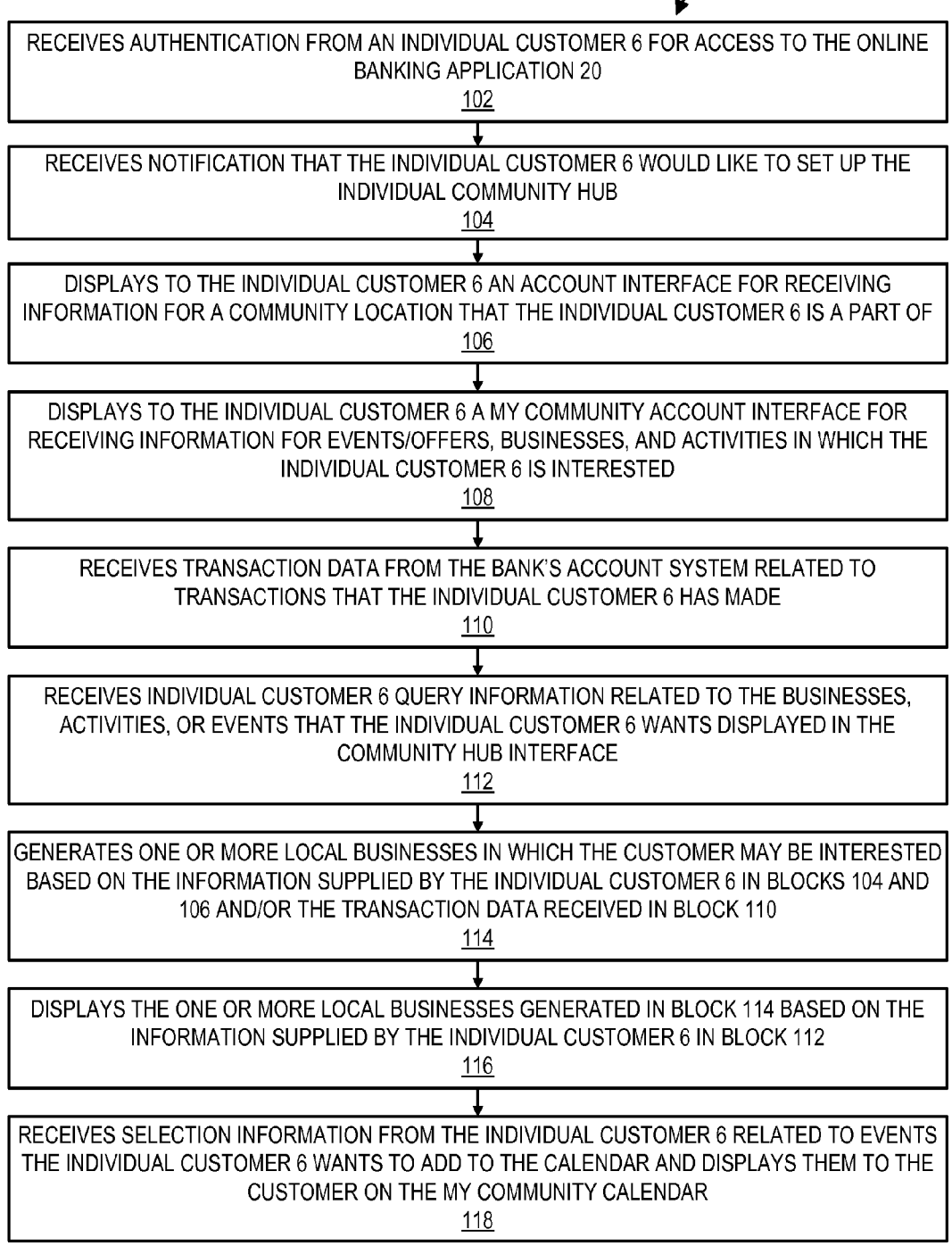

```
                                          ┌─ 300
                                              ONLINE BANKING  SIGN OFF
                            402   502    SEARCH • LOCATIONS • MAIL • HELP • EN ESPAÑOL ▽ ─ 302
304 ─ ACCOUNTS | BILL PAY | TRANSFERS | INVESTMENTS | CUSTOMER SERVICE | COMMUNITY HUB
      MY COMMUNITY | MY COMMUNITY | MY COMMUNITY
      ACCOUNT      | HUB          | CALENDAR
                                    306
      COMMUNITY LOCATION   [ XXXXX        ▽ ]
             -ENTER ADDRESS, ZIP, CITY, STREET, TOWN, AREA CODE, ETC.
310 ─ EVENTS
```

| EVENT | DATE | ADD | △ |
|---|---|---|---|
| EVENT 1 | 9/23/09 | ☐ | |
| EVENT 2 | 10/3/09 | ☐ | |
| EVENT 3 | 10/25/09 | ☒ | ▽ |

320 ─ BUSINESSES

| BUSINESSES | ACTIVITY | ADD | △ |
|---|---|---|---|
| BUSINESS 1 | FOOD | ☐ | |
| BUSINESS 2 | AUTO | ☒ | |
| BUSINESS 3 | SPORTS | ☐ | ▽ |

330 ─ ACTIVITIES

| ACTIVITIES | ADD | △ |
|---|---|---|
| SPORTING EVENTS | ☒ | |
| COOKING | ☐ | |
| EXERCISING | ☐ | ▽ |

[ SUBMIT ] ─ 308

FIG. 3

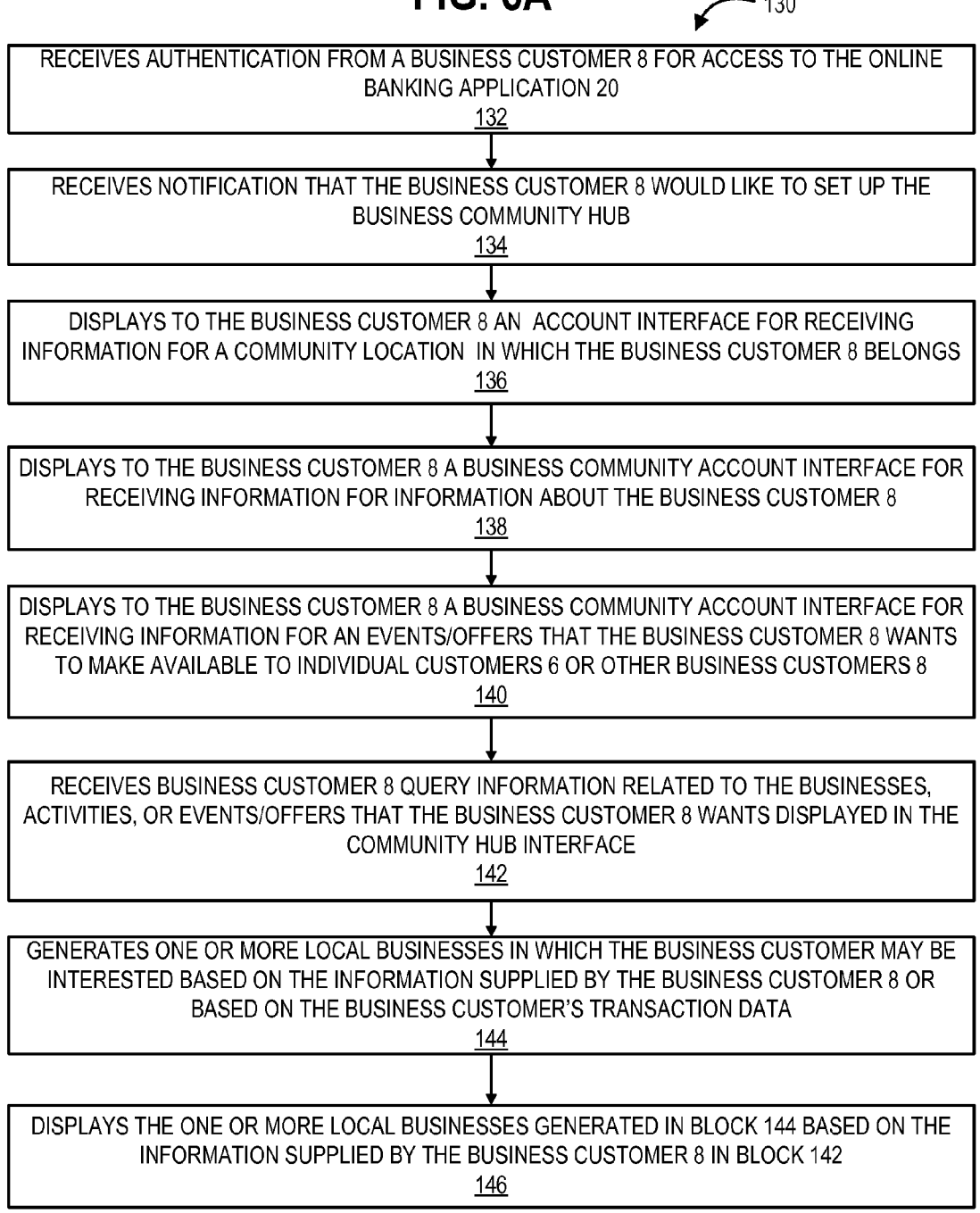

ONLINE BANKING  SIGN OFF
                                        802      902     SEARCH•LOCATIONS•MAIL•HELP•EN ESPAÑOL
                ACCOUNTS | BILL PAY | TRANSFERS | INVESTMENTS | CUSTOMER SERVICE | COMMUNITY HUB
                BUSINESS COMMUNITY | BUSINESS COMMUNITY | BUSINESS COMMUNITY
                      ACCOUNT      |        HUB         |       CONTACTS

COMMUNITY LOCATION        [ XXXXX            ▽ ]
                         — ENTER ADDRESS, ZIP CODES, CITIES, STREETS, TOWNS, AREA CODES, ETC.

ENTER/CHANGE BUSINESS INFORMATION

NAME:      [                              ]
                  ADDRESS:   [                              ]
                  WEBSITE LINK: [                           ]
                                                    [SUBMIT]

ADD EVENT/OFFER

TITLE:       [                            ]
                  DESCRIPTION: [                            ]

ACTIVITY:    [                            ]
                  EVENT:       [                            ]
                  OFFER:       [                            ]
                  LINK:        [                            ]
                  UPLOAD:      [                          ▽ ]
                  TYPE:        [                            ]
                  CUSTOMER
                  DESTINATION: [                          ▽ ]

[SUBMIT]

ONLINE BANKING  SIGN OFF
SEARCH • LOCATIONS • MAIL • HELP • EN ESPAÑOL

802

| ACCOUNTS | BILL PAY | TRANSFERS | INVESTMENTS | CUSTOMER SERVICE | COMMUNITY HUB |

| BUSINESS COMMUNITY ACCOUNT | BUSINESS COMMUNITY HUB | BUSINESS COMMUNITY CONTACTS | |

810
- 812 DISPLAY: [ALL ▽] — 812
- 814 SEARCH CATEGORY: [ ▽ ]
- 816 TERMS: [ ]

[SEARCH] — 822

830

| DATE (832) | BUSINESS (834) | ACTIVITY (836) | EVENT (838) | OFFER (840) | TYPE (842) | REVIEWS (844) |
|---|---|---|---|---|---|---|
| 10/25/09 | BUSINESS 1 | SPORTING EVENTS- FOOTBALL | GAME | DISCOUNT TICKETS FOR YOUR OFFER | EVENT TICKETS | 8.7 |
| 11/2/09 | BUSINESS 2 | DINING | LUNCH SPECIAL | 10% CATERING | CATERING | 8.0 |
| 11/15/09 | BUSINESS 3 | SHOPPING | CLEARANCE SALE | 50% OFF CLEARANCE ITEMS | HOME GOODS | 7.2 |
| 11/20/09 | BUSINESS 4 | CONSTRUCTION | WINTER SAVINGS | 10% OFF | OFFICE REPAIR | 8.9 |
| 11/22/09 | BUSINESS 5 | DRY CLEANERS | OFFICE DISCOUNT | $5 OFF FIRST TIME | OFFICE SERVICES | 6.5 |
| 12/30/09 | BUSINESS 6 | LAWN CARE | OFFICE DISCOUNT | 10% OFF 6 MONTH CONTRACT | PROPERTY MANAGE | 7.3 |

FIG. 8

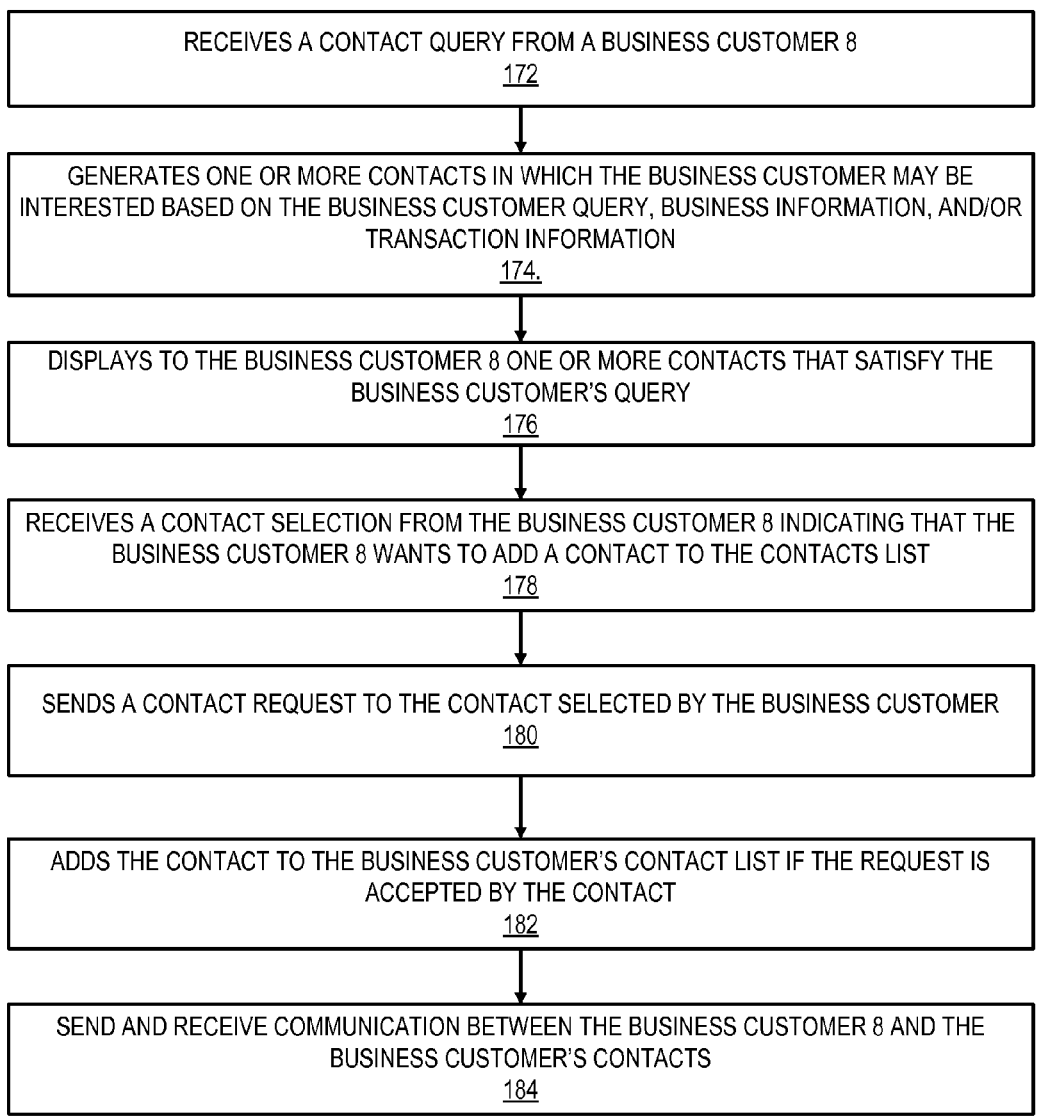

*900*

ONLINE BANKING  SIGN OFF
SEARCH • LOCATIONS • MAIL • HELP • EN ESPAÑOL ▽

| ACCOUNTS | BILL PAY | TRANSFERS | INVESTMENTS | CUSTOMER SERVICE | COMMUNITY HUB |

| BUSINESS COMMUNITY ACCOUNT | BUSINESS COMMUNITY HUB | BUSINESS COMMUNITY CONTACTS | ~902 |

904 — BUSINESS NAME: BUSINESS XYZ - EDIT PROFILE — 906

910 — CONTACT LIST:  914  916  918  920  922

| BUSINESS | TYPE | LOCATION | BUSINESS DESCRIPTION | CONTACT NAME | CONTACT NUMBER/EMAIL |
|---|---|---|---|---|---|
| BUSINESS 1 | FINANCIAL SERVICES | xxxxxxx | PROVIDES SMALL BUSINESS FINANCING | xxxxxxx | xxxxxxx |
| BUSINESS 2 | LAW FIRM | xxxxxxx | LEGAL ADVICE FOR SMALL BUSINESS | xxxxxxx | xxxxxxx |
| BUSINESS 3 | PAYROLL SERVICES | xxxxxxx | PROVIDES SMALL BUSINESS PAYROLL SERVICES | xxxxxxx | xxxxxxx |

912

930 — SEARCH CONTACTS  934

932 — CATEGORY: [TYPE ▽]   TERMS: [PROPERTY MANAGEMENT]  936 [SUBMIT]  950

942  944  946  948

| BUSINESS | TYPE | LOCATION | BUSINESS DESCRIPTION | ADD CONTACT |
|---|---|---|---|---|
| BUSINESS 4 | PROPERTY MANAGER | xxxxxxx | LAWN CARE SERVICES | [ADD] |
| BUSINESS 5 | PROPERTY MANAGER | xxxxxxx | OFFICE MANAGEMENT SERVICES | [ADD] |
| BUSINESS 6 | PROPERTY MANAGER | xxxxxxx | RENTAL PROPERTY MANAGEMENT SERVICES | [ADD] |

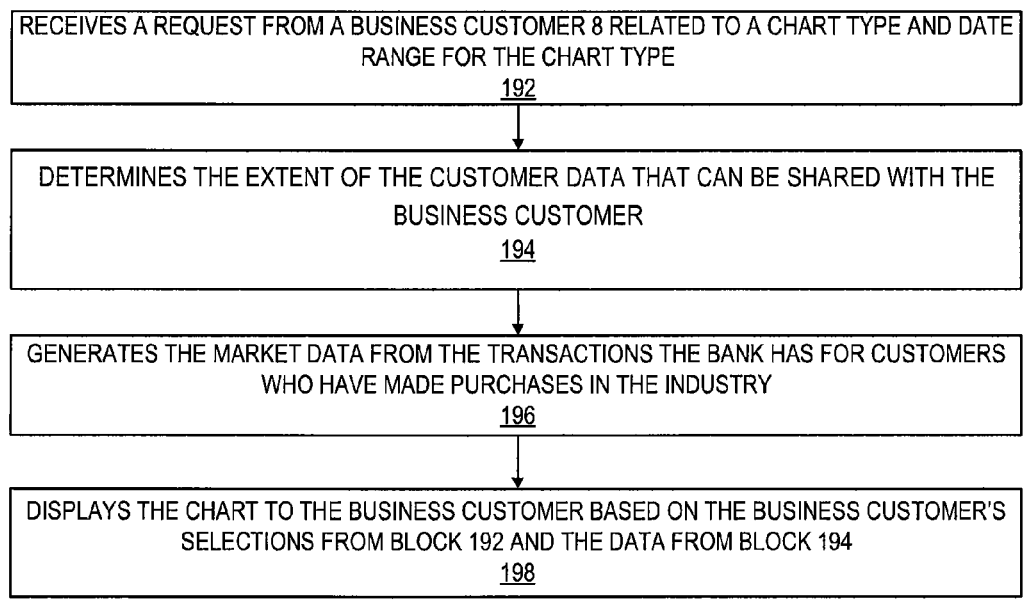

FIG. 10B

| TRANSACTIONS | 1214 | 1216 | 1218 | 1220 | 1222 | 1224 | 1226 |
|---|---|---|---|---|---|---|---|
| DATE | DESCRIPTION | TYPE | STATUS | AMOUNT | BALANCE | PAYEE | REVIEW |
| 10/17/09 | MOBILE PHONE BILL | DEBIT | PENDING | $XX.XX | XXXX | PHONE CO. | 8.5 |
| 10/16/09 | MOVIES | DEBIT | COMPLETE | $XX.XX | XXXX | THEATER | 7 |
| 10/12/09 | DINING | CREDIT | PENDING | $XX.XX | XXXX | THAI CUISINE | NR |
| 10/10/09 | SHOPPING-CLOTHES | DEBIT | COMPLETE | $XX.XX | XXXX | DEPT. GOODS | 9 |
| 10/3/09 | SHOPPING-FOOD | DEBIT | COMPLETE | $XX.XX | XXXX | GROCERY CO. | 6 |
| 9/27/09 | SHOPPING-HOME IMP. | DEBIT | COMPLETE | $XX.XX | XXXX | HOME SALES | 6.5 |

FIG. 12

COMMUNITY HUB REVIEW

FIELD

This invention relates generally to the field of community banking, and more particularly embodiments of the invention relate to apparatuses and methods for online banking portals that provide special community banking oriented services for reviewing businesses and events that are a part of the community hub.

BACKGROUND

With increased demand for lower costs and improved customer service, banks continue to grow in size. Today's large national and international banks have many advantages compared to small banks. Perhaps the most obvious advantage to banking with a large national or international bank is the stability of the bank and, thereby, the safety of a customer's money and confidential information. Due to their size and the amount of capital that they manage, large banks can usually provide many different services to customers. Customer service at a large bank may also be better in many respects. For example, a customer of a large bank may be able to find an automated teller machine (ATM), bank branch, or other banking center within a few minutes of most locations in the country or world frequented by the customer. In this way, customers of large banks can often access their finances more easily from anywhere in the world and at any time of day compared to customers of small banks. Furthermore, transactions may be handled by a larger bank more quickly and with fewer errors than a smaller bank. Large banks also traditionally offer a greater variety of financial products and services to their customers.

One potential downside to some large banks is a movement away from the feeling of a local community bank. Furthermore, with the invention of ATMs and the expansion of banks into online banking (i.e. banking over the Internet), individual and business banking customers are increasingly less likely to go into a bank branch and interact with bank employees. Banking customers can transfer money between accounts, pay accounts payable, open individual retirement accounts ("IRAs"), open certificate of deposit ("CD") accounts, purchase stocks, etc. online, through the customer's online banking accounts. Customers can even make deposits at ATMs or remote banking machines located at their places of work, or even using their cell phones. While these activities provide customers with more options and convenience, it has also significantly changed the customer experience of banking with a local community bank.

As a result of the new technology and trends towards larger banks, banks are less likely to be places within a community where individual customers and business customers interact with each other and the bank employees on a regular basis. Personal relationships are rarely forged today between a bank's individual customers, business customers, and/or employees, which is unfortunate because these relationships can be mutually beneficial to the each party as well as the local community as a whole. Furthermore, when banks do participate in local community events or charities they often are not widely recognized by their customers unless the customers are directly involved in the events or charities.

Therefore, there is a need to develop apparatuses and methods that help banks to provide its individual and business customers with a more local banking experience focused on the communities in which these customers live, work, and do business.

BRIEF SUMMARY

Embodiments of the present invention address the above needs and/or achieve other advantages by providing apparatuses (e.g., a system, computer program product, and/or other device) and methods that provides a bank-based local community hub where individual banking customers and business banking customers within a local community have a forum to interact with each other to exchange information related to activities, local events, offers, business knowledge, business contacts, business reviews, and/or the like.

Generally the business review application provides a customer with a bank-hosted business review platform. The review forum provided by the business review application provides an advertising and feedback service for the bank's business customers and provides a rating, review, feedback, and recommendation service for the bank's individual and business customers. In general, the business review application allows the bank's individual customers to rate and review the bank's business customers, or, in some embodiments, both customer and non-customer businesses. In some such embodiments, the bank uses its authentication systems used by its customers to access conventional online banking services to also authenticate the identity of the customer creating a business review in the business review platform. Furthermore, in some embodiments, the business review application only permits its customers to make one review of a business within a certain period of time or one review after a transaction with that business shows up in the customer's transaction information maintained by the bank. In this way, the bank can host a review platform that is much more accurate and trustworthy than traditional business review platforms. The business review platform may be accessible by bank customers only or, alternatively, may be provided to the public generally.

One embodiment of the invention is a local community hub review system for an online banking system. The local community hub review system comprises a memory device, a communication device, and a processing device, wherein processing device is operatively coupled to the memory device and the communication device. The processing device is configured to execute computer-readable program code to receive input from a customer related to a business or event the customer wants to review. The processing device is further configured to access from a community hub the reviews of the business or event. The processing device is also configured to display on a community hub interface the reviews of the business or event. The processing device is further configured to receive input from a customer for assigning a review score associated with the business or event the customer wants to review.

In further accord with an embodiment of the invention, the processing device configured to execute computer-readable program code to receive input from a customer related to a review score associated with the business or event the customer wants to review is further configured to only allow a customer to assign a review score if the customer is a bank customer, wherein the bank controls the online banking system.

In another embodiment of the invention, the processing device configured to execute computer-readable program code to receive input from a customer related to a review score associated with the business or event the customer wants to review is further configured to only allow a customer to assign a score if the customer is not affiliated with the business or event being reviewed.

In yet another embodiment of the invention, the processing device is further configured to execute computer-readable program code to calculate an average review score for the business or event based at least in part on the review score assigned by the customer and the review scores of other customers of the business or event.

In another embodiment of the invention, the processing device is further configured to execute computer-readable program code to receive customer input related to a contact that the customer would like to add to the customer's contacts list.

In yet another embodiment of the invention, the processing device is further configured to execute computer-readable program code to receive customer input related to search criteria for identifying a contact the customer would like to identify, wherein the contact is another customer of a bank that operates the online baking system, and wherein the contact is a part of the community hub.

In further accord with an embodiment of the invention, the processing device is further configured to execute computer-readable program code to receive customer input related to a contact in the customer's contact list, and to display in a review interface one or more businesses or events in the local community that the contact has reviewed.

In another embodiment of the invention, the processing device is further configured to execute computer-readable program code to determine a certification status of the business in the community hub, wherein the business is a bank customer, wherein the bank controls the online banking system, and wherein the certification status of the business is based on the financial information the bank has regarding the business.

In yet another embodiment of the invention, the processing device is further configured to provide a link in the customer's online banking transaction statement to review the business associated with a transaction the customer made that is listed in the online banking transaction statement.

In another embodiment of the invention, the processing device configured to execute computer-readable program code to display on a community hub interface the reviews of the business or event, is further configured to display the community hub interface in a separate window from the interface the customer is viewing.

Another embodiment of the invention is a computer program product for a local community hub review system for an online banking system. The computer program product comprising at least one non-transitory computer-readable medium having computer-readable program code portions embodied therein. The computer-readable program code portions comprise an executable portion configured for receiving input from a customer related to a business or event the customer wants to review. The computer-readable program code portions further comprise an executable portion configured for accessing from a community hub the reviews of the business or event. The computer-readable program code portions also comprise an executable portion configured for displaying on a community hub interface the reviews of the business or event. The computer-readable program code portions further comprise an executable portion configured for receiving input from a customer for assigning a review score associated with the business or event the customer wants to review.

In further accord with an embodiment of the invention, the executable portion configured for receiving input from a customer related to a review score associated with the business or event the customer wants to review is further configured for only allowing a customer to assign a review score if the customer is a bank customer, wherein the bank controls the online banking system.

In another embodiment of the invention, the executable portion configured for receiving input from a customer related to a review score associated with the business or event the customer wants to review is further configured for only allowing a customer to assign a score if the customer is not affiliated with the business or event being reviewed.

In yet another embodiment of the invention, the computer program product further comprises an executable portion configured for calculating an average review score for the business or event based at least in part on the review score assigned by the customer and the review scores of other customers of the business or event.

In another embodiment of the invention, the computer program product further comprises an executable portion configured for receiving customer input related to a contact that the customer would like to add to the customer's contacts list.

In yet another embodiment of the invention, the computer program product further comprises an executable portion configured for receiving customer input related to search criteria for identifying a contact the customer would like to identify, wherein the contact is another customer of a bank that operates the online baking system, and wherein the contact is a part of the community hub.

In further accord with an embodiment of the invention, the computer program product further comprises an executable portion configured for receiving customer input related to a contact in the customer's contact list, and displaying in a review interface one or more businesses or events in the local community that the contact has reviewed.

In another embodiment of the invention, the computer program product further comprises an executable portion configured for determining a certification status of the business in the community hub, wherein the business is a bank customer, wherein the bank controls the online banking system, and wherein the certification status of the business is based on the financial information the bank has regarding the business.

In yet another embodiment of the invention, the computer program product further comprises an executable portion configured for providing a link in the customer's online banking transaction statement to review the business associated with a transaction the customer made that is listed in the online banking transaction statement.

In another embodiment of the invention, the executable portion configured for displaying on a community hub interface the reviews of the business or event, is further configured to display the community hub interface in a separate window from the interface the customer is viewing.

Another embodiment of the invention is a local community hub review method for an online banking system. The method comprises receiving input from a customer related to a business or event the customer wants to review, using a processing device operatively coupled to a memory device, and a communication device, and configured to execute computer-readable program code. The method further comprises accessing from a community hub the reviews of the business or event, using the processing device. The method also comprises displaying on a community hub interface the reviews of the business or event, using the processing device. The method further comprises receiving input from a customer for assigning a review score associated with the business or event the customer wants to review, using the processing device.

In further accord with an embodiment of the invention, receiving input from a customer related to a review score associated with the business or event the customer wants to review further comprises only allowing a customer to assign a review score if the customer is a bank customer, wherein the bank controls the online banking system.

In another embodiment of the invention, receiving input from a customer related to a review score associated with the business or event the customer wants to review further comprises only allowing a customer to assign a score if the customer is not affiliated with the business or event being reviewed.

In yet another embodiment of the invention, the method further comprises calculating an average review score for the business or event based at least in part on the review score assigned by the customer and the review scores of other customers of the business or event, using the processing device.

In another embodiment of the invention, the method further comprises receiving customer input related to a contact that the customer would like to add to the customer's contacts list, using the processing device.

In yet another embodiment of the invention, the method further comprises receiving customer input related to search criteria for identifying a contact the customer would like to identify, using the processing device, wherein the contact is another customer of a bank that operates the online baking system, and wherein the contact is a part of the community hub.

In further accord with an embodiment of the invention, the method further comprises receiving customer input related to a contact in the customer's contact list, using the processing device, and displaying in a review interface one or more businesses or events in the local community that the contact has reviewed, using the processing device.

In another embodiment of the invention, the method further comprises determining a certification status of the business in the community hub, using the processing device, wherein the business is a bank customer, wherein the bank controls the online banking system, and wherein the certification status of the business is based on the financial information the bank has regarding the business.

In yet another embodiment of the invention, the method further comprises providing a link in the customer's online banking transaction statement to review the business associated with a transaction the customer made that is listed in the online banking transaction statement.

In another embodiment of the invention, displaying on a community hub interface the reviews of the business or event, further comprises displaying the community hub interface in a separate window from the interface the customer is viewing.

The features, functions, and advantages that have been discussed may be achieved independently in various embodiments of the present invention or may be combined in yet other embodiments, further details of which can be seen with reference to the following description and drawings.

BRIEF DESCRIPTION OF THE SEVERAL VIEWS OF THE DRAWINGS

Figure 1:
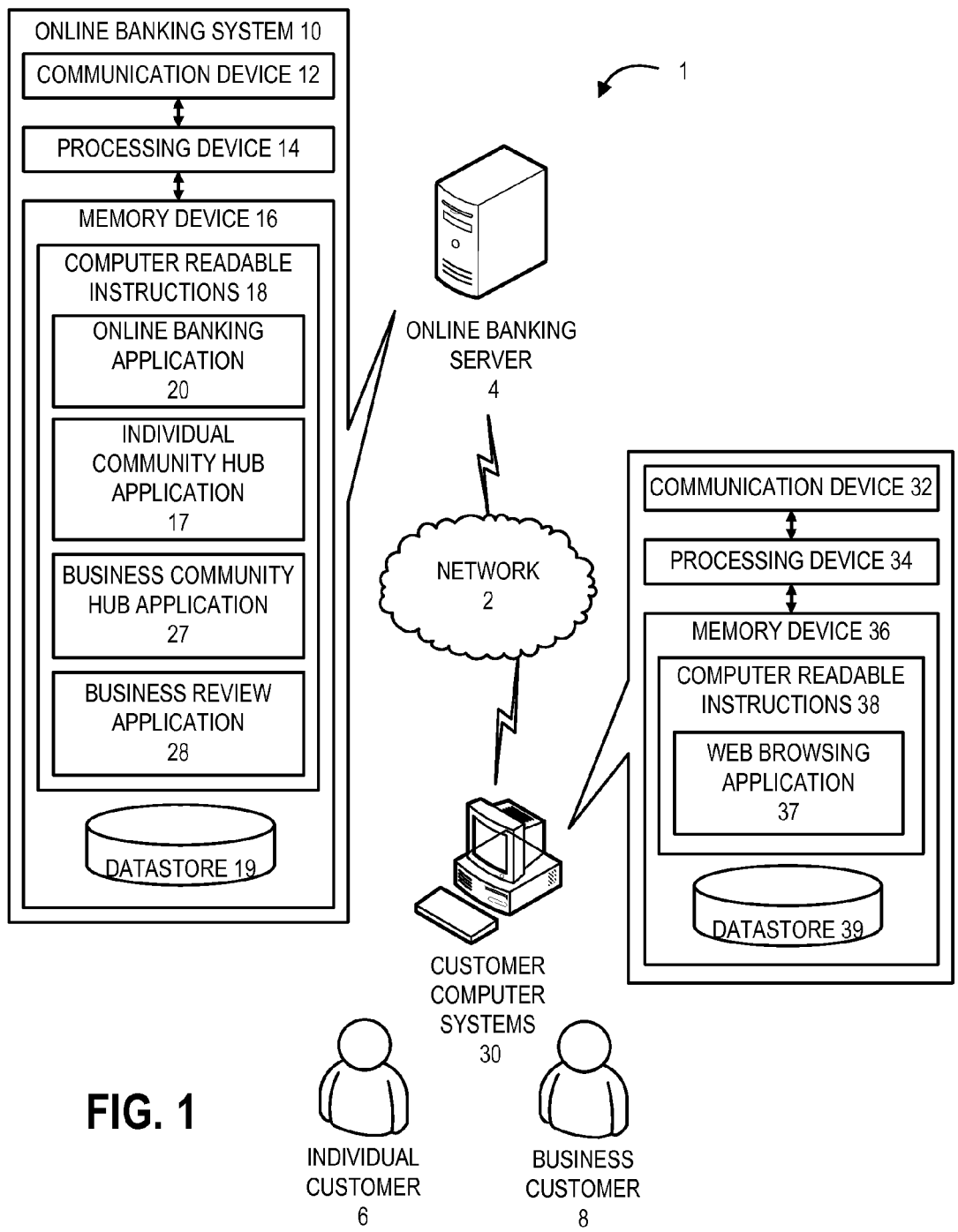
Figure 2B:
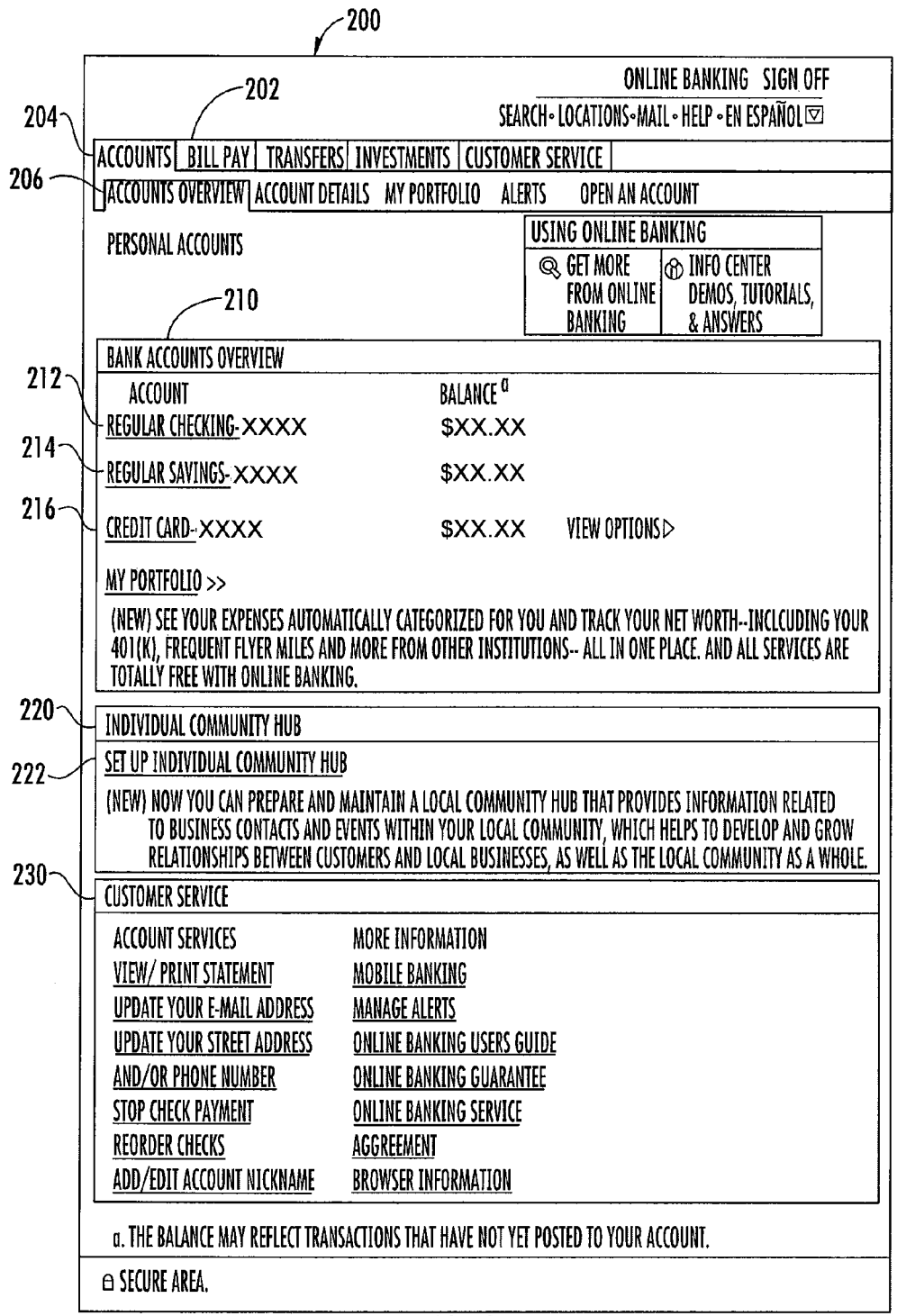
Figure 4:
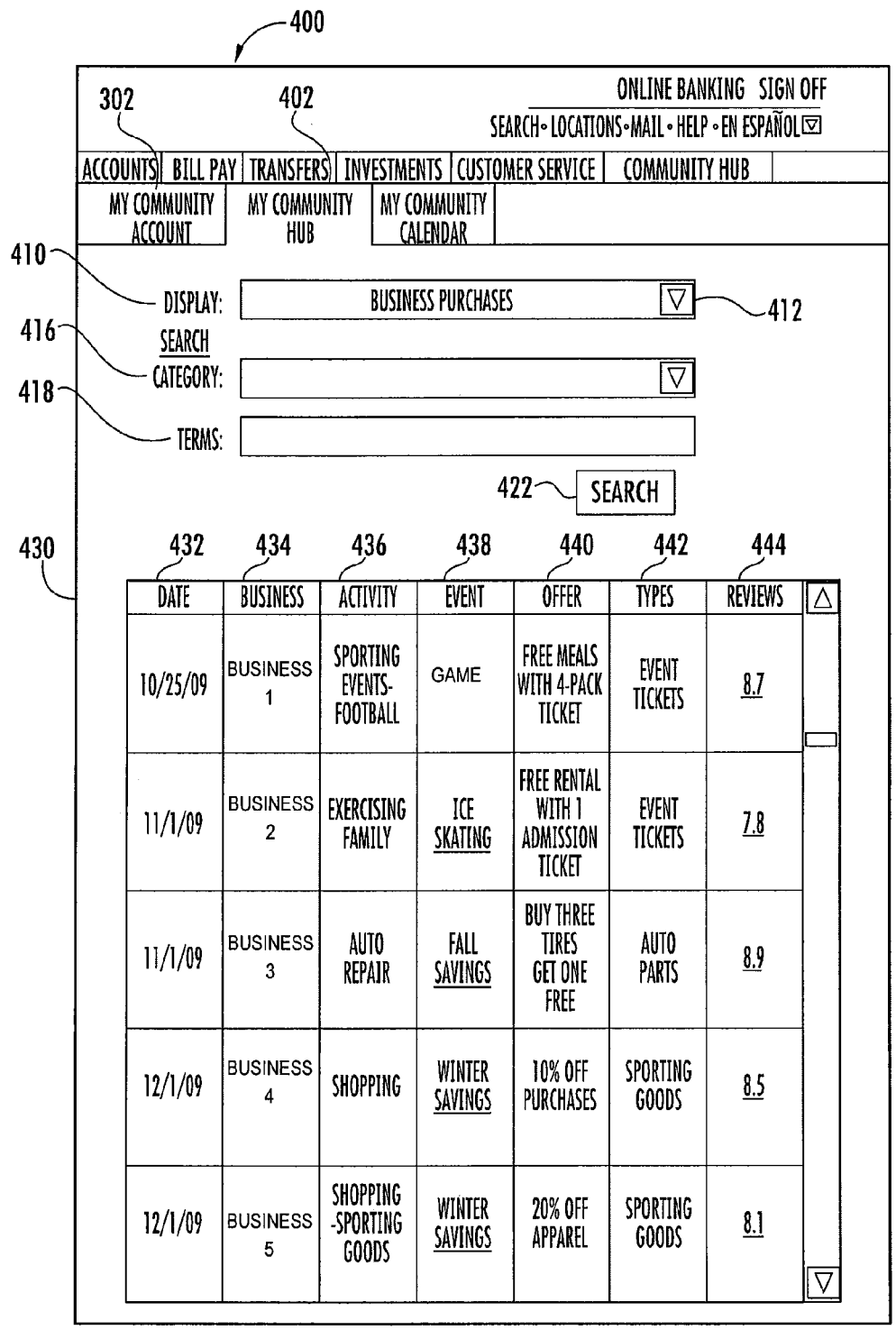
Figure 5:
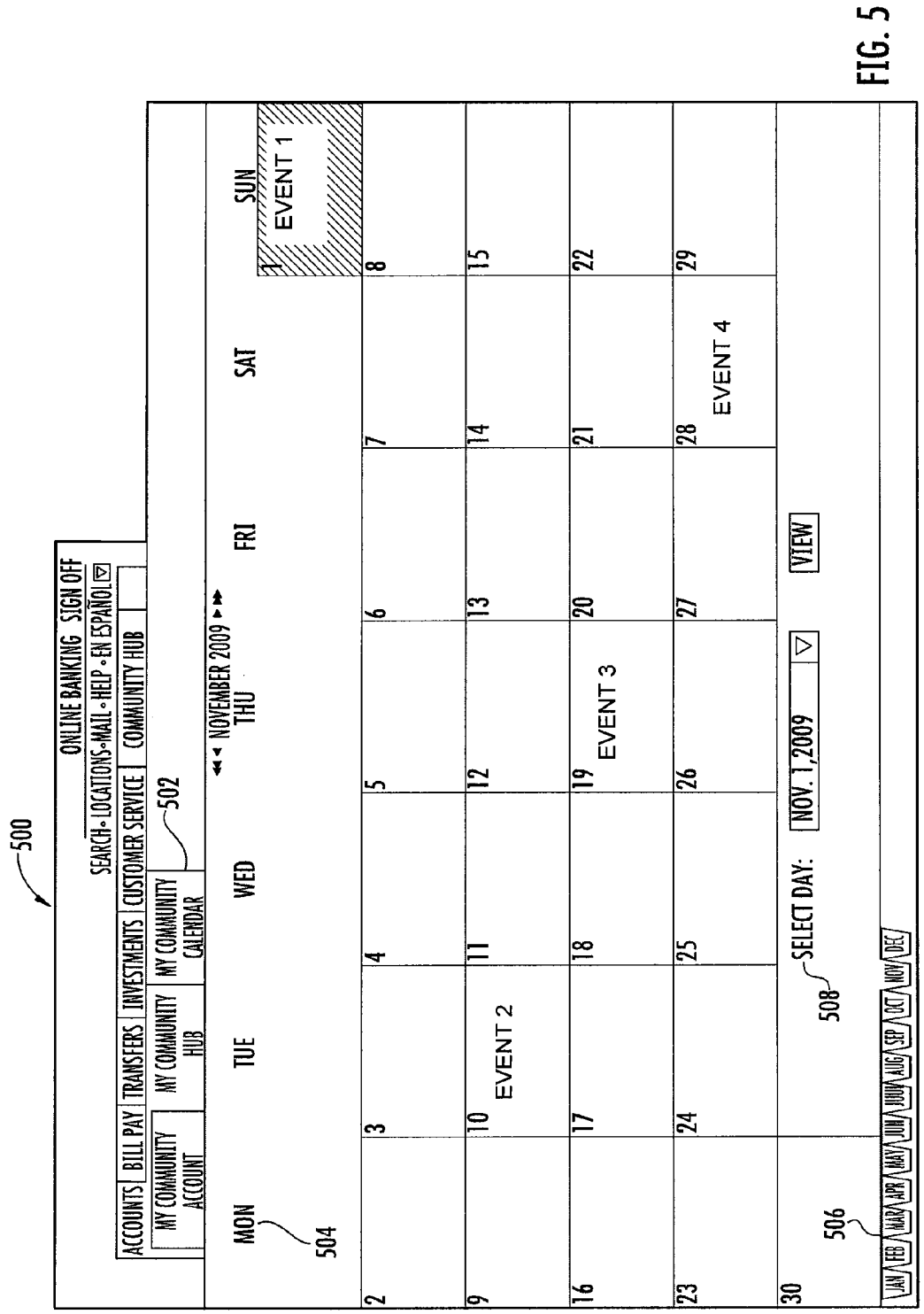
Figure 6B:
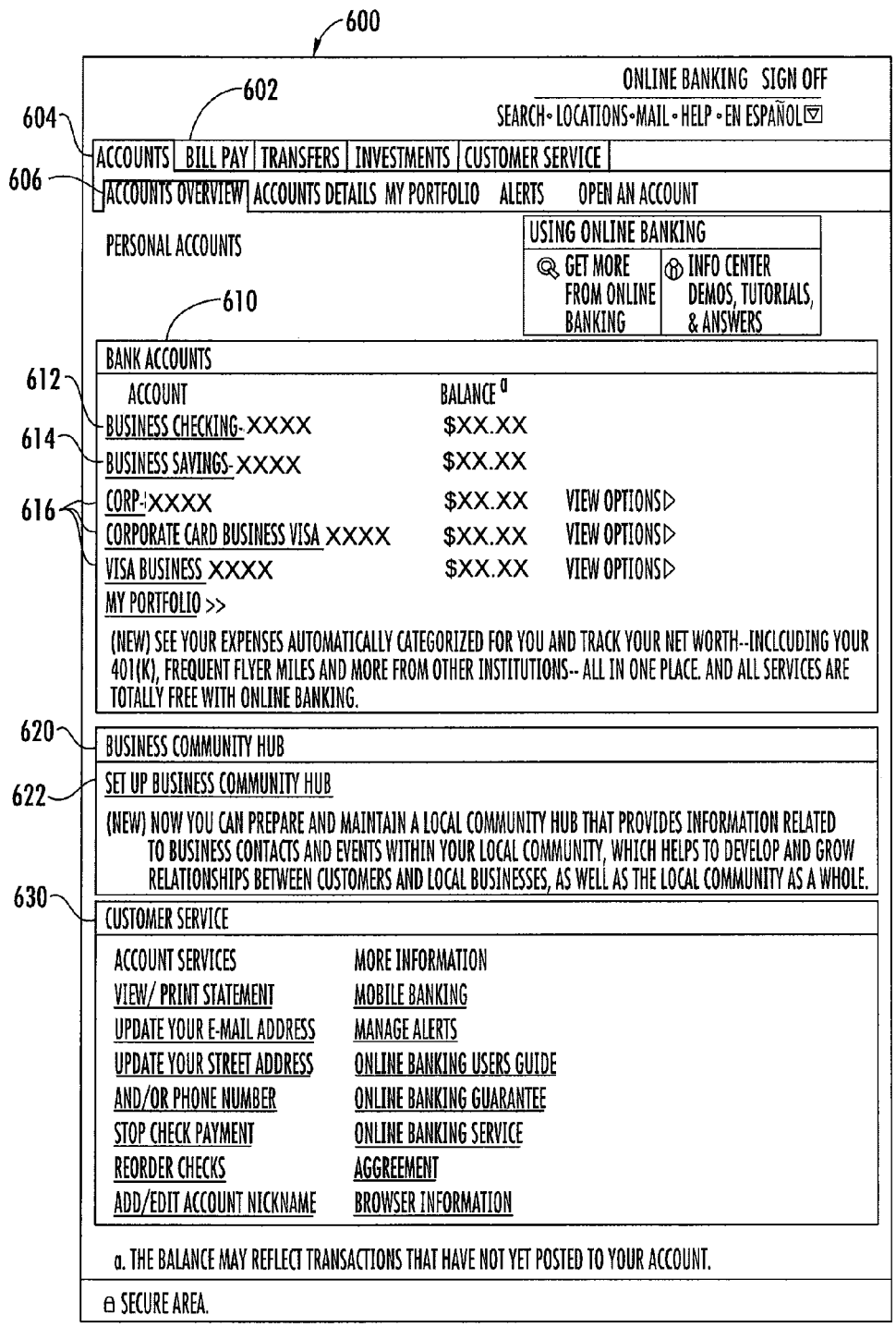
Figure 9D:
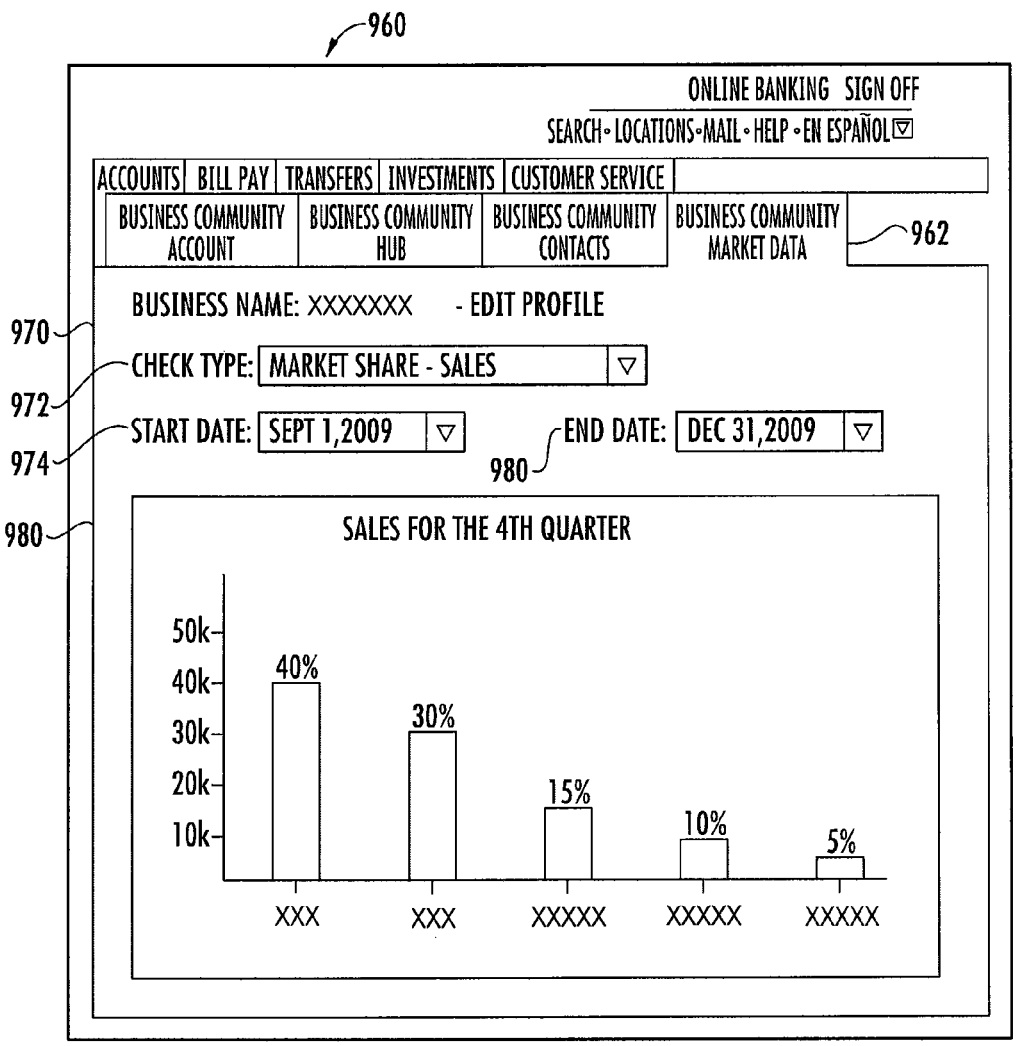
Figure 10A:
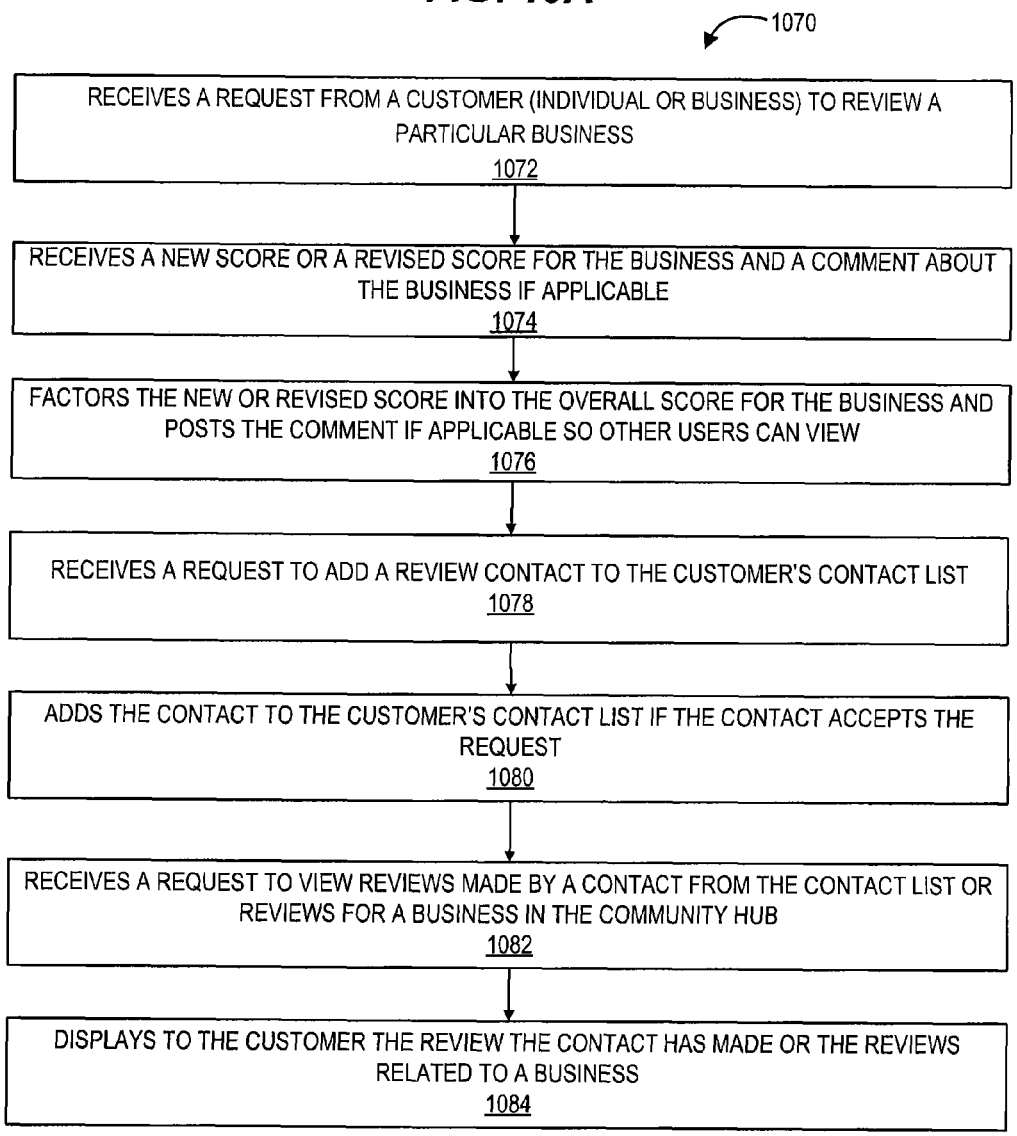
Figure 11:
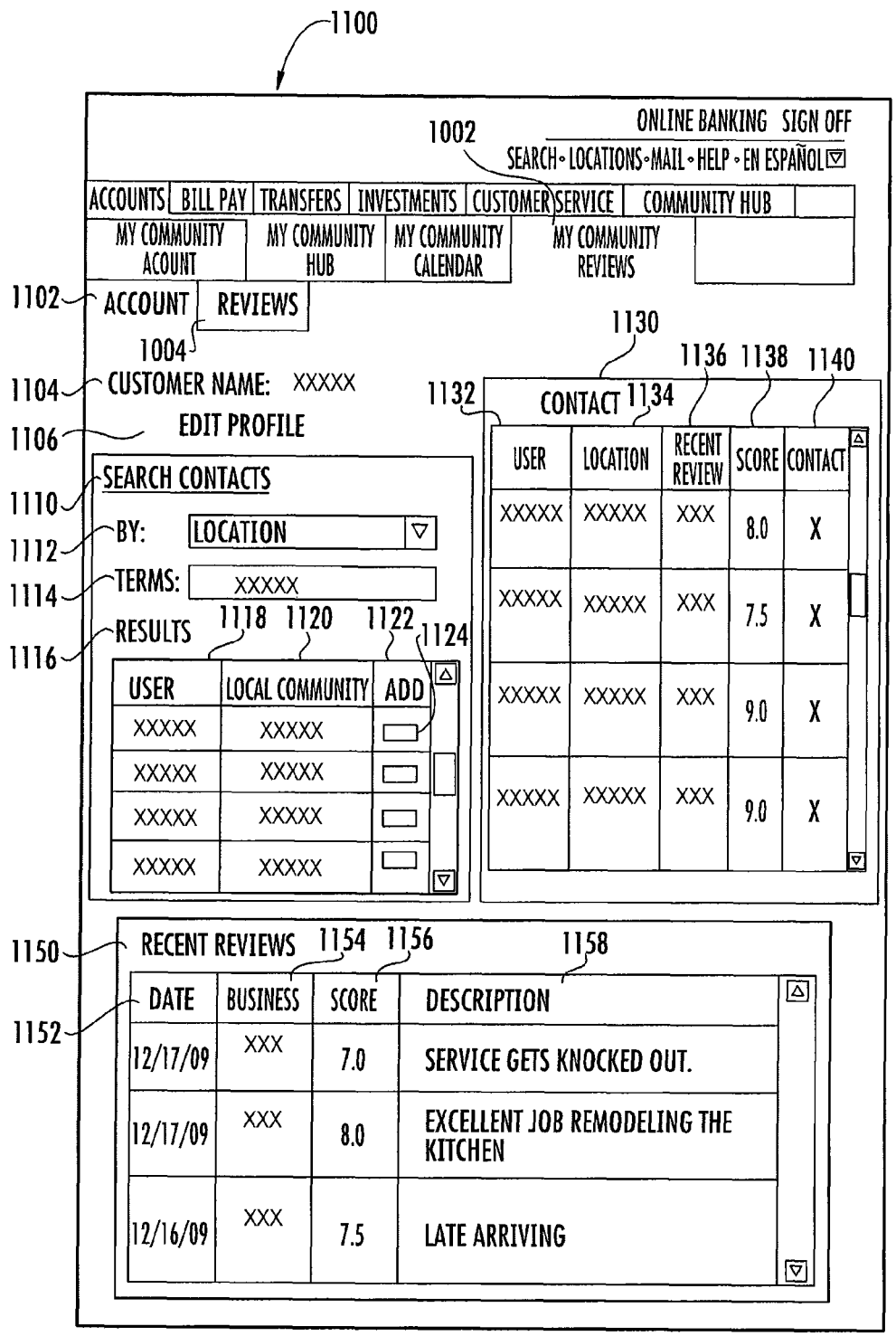

Having thus described embodiments of the invention in general terms, reference will now be made to the accompanying drawings, wherein:

FIG. 1 provides a block diagram illustrating a community hub environment, in accordance with an embodiment of the present invention;

FIG. 2A provides a process map illustrating an individual community hub set-up and implementation process, in accordance with one embodiment of the present invention;

FIG. 2B provides an interface illustrating an individual online banking home page, in accordance with one embodiment of the present invention;

FIG. 3 provides an interface illustrating an individual community account interface, in accordance with one embodiment of the present invention;

FIG. 4 provides an interface illustrating an individual community hub interface, in accordance with one embodiment of the present invention;

FIG. 5 provides an interface illustrating a individual community calendar interface, in accordance with one embodiment of the present invention;

FIG. 6A provides a process map illustrating a business community hub set-up and implementation process, in accordance with one embodiment of the present invention;

FIG. 6B provides an interface illustrating a business online banking home page, in accordance with one embodiment of the present invention;

FIG. 7 provides an interface illustrating a business community account interface, in accordance with one embodiment of the present invention;

FIG. 8 provides an interface illustrating a business community hub interface, in accordance with one embodiment of the present invention;

FIG. 9A provides a process map illustrating a process for developing business contacts, in accordance with one embodiment of the present invention;

FIG. 9B provides an interface illustrating a business community contacts interface, in accordance with one embodiment of the present invention;

FIG. 9C provides a process map illustrating a process for displaying market data, in accordance with one embodiment of the present invention;

FIG. 9D provides an interface illustrating a business market data interface, in accordance with one embodiment of the present invention;

Figure 10B:
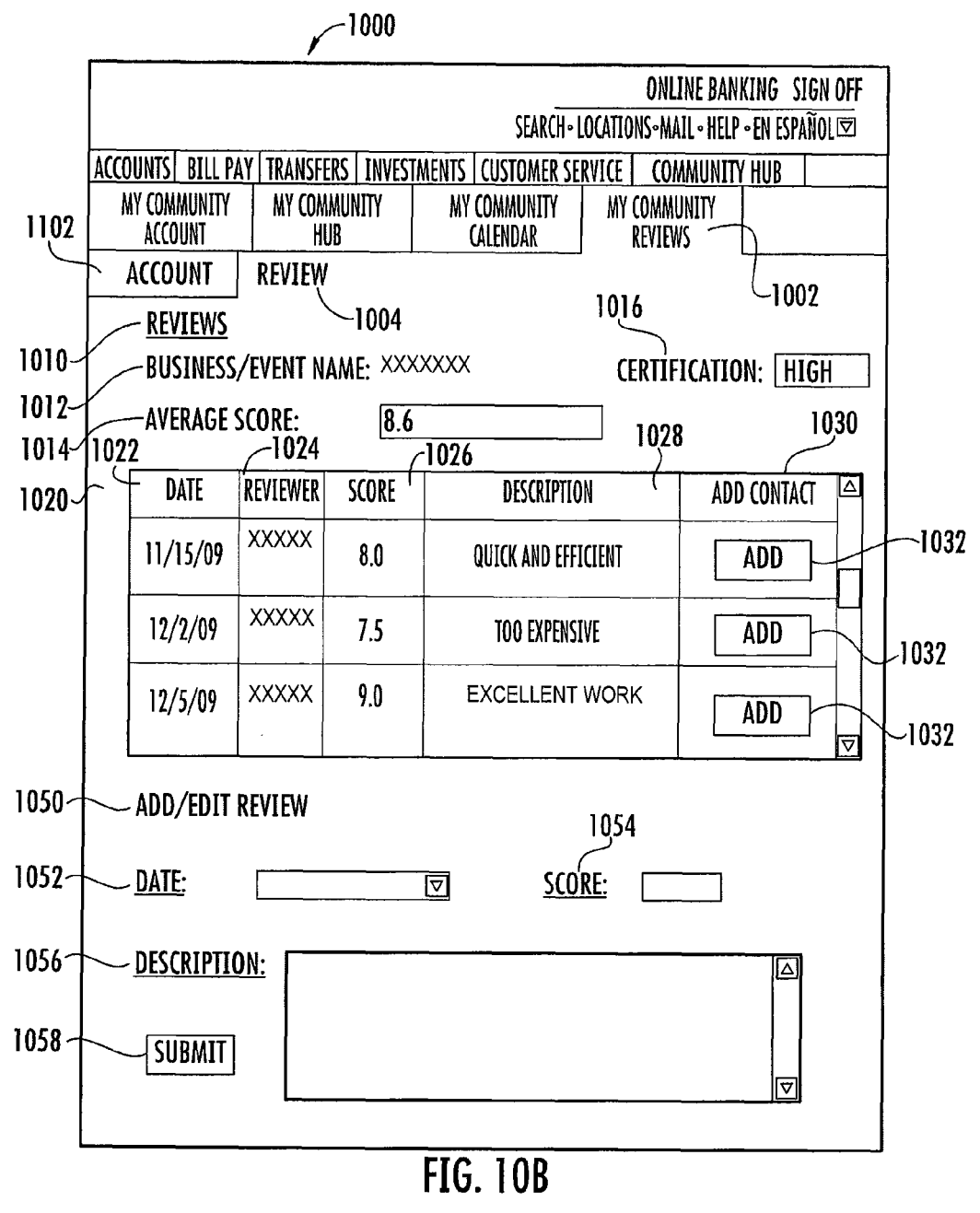

FIG. 10A provides a process map illustrating a process for reviewing businesses and developing business review contacts, in accordance with one embodiment of the present invention;

FIG. 10B provides an interface illustrating a community reviews interface, in accordance with one embodiment of the present invention;

FIG. 11 provides an interface illustrating a community review account interface, in accordance with one embodiment of the present invention; and FIG. 12 provides an interface illustrating a transaction interface with business review, in accordance with one embodiment of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout. Although some embodiments of the invention described herein are generally described as involving a "bank," one of ordinary skill in the art will appreciate that other embodiments of the invention may involve other businesses or financial institutions that take the place of or work in conjunction with the bank to perform one or more of the processes or steps described herein as being performed by a bank.

As will be appreciated by one of ordinary skill in the art in view of this disclosure, the present invention may be embodied as an apparatus (including, for example, a system, machine, device, computer program product, and/or the like), as a method (including, for example, a business process, computer-implemented process, and/or the like), or as any combination of the foregoing. Accordingly, embodiments of the present invention may take the form of an entirely software embodiment (including firmware, resident software, micro-code, etc.), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out operations of the present invention may include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, etc.) that can direct a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator- and/or human-implemented steps in order to carry out an embodiment of the present invention.

FIG. 1 illustrates a community hub environment 1 in accordance with an embodiment of the present invention. As illustrated in FIG. 1, the online banking server 4 is operatively coupled, via a network 2 to the customer computer systems 30. In this way, an individual customer 6 or business customer 8 (collectively "customer" or "customers") located at the customer computer systems 30 can receive and send community hub information from and to the individual community hub application 17, the business community hub application 27, and the business review application 28. In some embodiments of the invention, the individual customer 6 is a single customer of the bank and the business customer 8 is an employee or other agent of a business that uses the bank for financial services and products. Both the individual customer 6 and business customer 8 are described herein generally as a "customer." The network 2 may be a global area network (GAN), such as the Internet, a wide area network (WAN), a local area network (LAN), or any other type of network or combination of networks. The network 2 may provide for wireline, wireless, or a combination of wireline and wireless communication between devices on the network.

As illustrated in FIG. 1, the online banking system 10 is located on the online banking server 4, and generally comprises a communication device 12, a processing device 14, and a memory device 16. As used herein, the term "processing device" generally includes circuitry used for implementing the communication and/or logic functions of a particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 14 is operatively coupled to the communication device 12, and the memory device 16. The processing device 14 uses the communication device 12 to communicate with the network 2, and other devices on the network 2, such as, but not limited to, the customer computer systems 8. As such, the communication device 12 generally comprises a modem, server, or other device for communicating with other devices on the network 2.

As further illustrated in FIG. 1, the online banking system 10 comprises computer-readable instructions 18 stored in the memory device 16, which in one embodiment include the computer-readable instructions 18 of an online banking application 20, an individual community hub application 17, a business community hub application 27, and a business review application 28. In some embodiments, the memory device 16 includes a datastore 19 for storing data related to the online banking system 10, including but not limited to data created and/or used by the online banking application 20, the individual community hub application 17, the business review application 28, and the business community hub application 27.

In the embodiment illustrated in FIG. 1 and described throughout much of this specification, the online banking application 20, the individual community hub application 17, the business community hub application 27, and the business review application 28 are illustrated as different applications, which work in conjunction with one another. It is to be understood that in other embodiments of the invention the online banking application 20, the individual community hub application 17, the business community hub application 27, and the business review application 28 could be a part of one application dedicated to online banking, which works in substantially the same way as four separate applications working in conjunction with each other. Similarly, it will be understood that systems, devices, servers, processors, computers, networks, and other devices described herein may be made up of one system, device, server, processor, computer, network, etc., or numerous systems, devices, servers, processors, computers, networks, etc. working in conjunction with each other.

The online banking application 20, generally provides a customer with the ability to log onto the customer's own online banking account to check account balances and transactions made, pay bills, make transfers, manage investments, manage accounts at other institutions, search for information related to financial services and products, etc. The online banking application 20 is generally a one stop location for providing and managing the financial service and product needs of bank customers.

The individual community hub application 17, generally provides an individual customer 6 the ability to access information related to events, businesses, offers, and activities that are a part of the individual customer's local community through the individual customer's online banking account. The individual customer 6 can search, identify, receive offers or discounts from, review, etc. the events, businesses, and activities in the individual customer's local community, in which the individual customer 6 might be interested.

The individual customer 6 can log onto the customer's online banking account, select a link to the community hub section of the online banking system 10 and view information about local businesses that are also customers of the bank and/or local event information taking place in the individual customer's local community. In one embodiment, the information provided to the individual customer 6 is based on the customer's local community, such as the individual customer's geographic location, as well as the individual customer's transaction information captured by the bank each time the individual customer 6 makes a purchase or completes a transaction through the bank. The information provided to the individual customer 6 may also be based on information obtained from the bank's relationship with the local businesses such as information provided to the bank by the local businesses and/or transaction information associated with these businesses. The information provided to the individual customer 6 may also be based on information obtained from the bank's relationship with other individual customers in the local community, such as information provided to the bank by these customers and/or transaction information associated with these customers. Within the individual community hub, the individual customer 6 can view a list of local businesses, which in some embodiments are all business customers 8 of the bank. In this way an individual customer's online banking account becomes the individual customer's source of local personalized community information, including, for example, local business information and local event information.

Some embodiments of the business community hub application 27 provide a business customer 8 the ability to add an event or offer to the community hub that can then be accessed by individual customers 6. Some embodiments of the business community hub application 27 also notify business customers 8 of offers provided by suppliers, sub-contractors, or other businesses and/or about local community events that may be of interest to the business customer 8. Some embodiments of the business community hub application 27 also use community transaction information available to the bank to display general transaction information and trends that may be of interest to the business customer 8. In some embodiments, the business customers 8 also have the ability to find contacts and network with other local businesses in order to foster local community relationships between customers, local businesses, and the community in general.

For example, in some embodiments of the invention, a business customer 8 that has a business account with the bank can view the local community hub information related to the business customer's own business as well as other businesses in the same local community. In some embodiments of the invention the businesses listed in the community hub could comprise a list of suppliers or distributors, advertisers, financial services, legal services, or other business contacts. In some embodiments of the invention, the business customer's community hub also provides community-wide transaction information relevant to the business customer 8. For example, the business customer's community hub may compare the sales processed by the bank for the customer's business versus sales by other local competitors. These other local competitors may not bank with the bank but the bank may still have purchase data about the competitors by way of transaction data from individual customers 6 that bank with the bank and shop at the business' competitors. In this way, the business community hub works with the online banking application as a tool for local businesses, it allows business customers 8 to interact with individual customers 6, the community in general, as well as other businesses, in a forum for exchanging products, services, and information.

The business review application 28 generally provides a customer with a bank-hosted business review platform. The review forum provided by the business review application 28 can provide an advertising and feedback service for the bank's business customers 8 and provide a rating, review, feedback, and recommendation service for the bank's individual customers 6. In general, the business review application 28 allows the bank's individual customers to rate and review the bank's business customers or, in some embodiments, both customer and non-customer businesses. In some such embodiments, the bank uses its authentication systems used by its customers to access conventional online banking services to also authenticate the identity of the customer creating a business review in the business review platform. Furthermore, in some embodiments, the business review application 28 only permits its customers to make one review of a business within a certain period of time or one review after a transaction with that business shows up in the customer's transaction information maintained by the bank. In this way, the bank can host a review platform that is much more accurate and trust-worthy than traditional business review platforms. The business review platform may be accessible by bank customers only or, alternatively, may be provided to the public generally.

As illustrated in FIG. 1, the customer computer systems 30 generally comprise a communication device 32, a processing device 34, and a memory device 36. The processing device 34 is operatively coupled to the communication device 32 and the memory device 36. The processing device 34 uses the communication device 32 to communicate with the network 2, and other devices on the network 2, such as, but not limited to, the online banking server 4, and/or other systems and servers at the bank that control the online banking server 4. As such, the communication device 32 generally comprises a modem, server, or other device(s) for communicating with other devices on the network 2, and a display, keypad, mouse, keyboard, microphone, and/or speakers for communicating with one or more customers.

As further illustrated in FIG. 1, the customer computer systems 30 comprise computer-readable program instructions 38 stored in the memory device 36, which in one embodiment includes the computer-readable instructions 38 of a web browsing application 37. In some embodiments, the memory device 36 includes a datastore 39 for storing data related to the customer computer systems 30, including but not limited to data created and/or used by the web browsing application 37. Customers utilize the web browsing application 37 to connect to the online banking application 20, individual community hub application 17, the business community hub application 27, and/or the business review application 28.

FIG. 2A illustrates an individual community hub set-up and implementation process 100, in accordance with one embodiment of the present invention. The individual customer 6 begins the process of setting up the community hub by first logging into the online banking application 20, which authenticates that the individual customer 6 is the correct customer and provides access to the individual customer's online banking account, as illustrated in block 102 of FIG. 2A.

FIG. 2B illustrates an individual online banking home page 200 that is accessed by an individual customer 6 through the online banking application 20, in accordance with one embodiment of the present invention. The individual online banking home page 200, has four sections, the individual tabs section 202, the bank account overview section 210, an individual community hub section 220 and a customer service section 230. The individual tabs section 202 allows the customer to navigate through the individual service section 204 of the online banking application 10, which includes tabs for, but not limited to the customer's accounts, bill pay, transfers, investments, and customer service. Customers can also navigate through more tabs in the individual service sub-section 206 of each of the tabs in the individual service section 204. For example, as illustrated under the accounts tab, the individual service sub-section 206 tabs include accounts overview, account details, my portfolio, alerts, and open-an-account tabs.

The accounts overview section 210 includes a summary of the account balances for a customer's checking accounts 212, savings accounts 214, and any credit card accounts 216 serviced through or tracked by the bank. The customer service section 230 includes various links to account management, service guidelines, help information, etc.

In one embodiment of the invention, as illustrated in FIG. 2B, the online banking home page 200 includes an individual community hub section 220. In this embodiment, the individual community hub section 220 includes a set-up link 222 that allows a customer to set up the customer's personalized individual community hub, if the customer has not already done so. As illustrated in block 104 of FIG. 2A, the individual customer 6 can select the set-up link 222 if the individual customer 6 is interested in setting up a community hub. In other embodiments of the invention, if the customer has already registered or set up her individual community hub, then the individual hub section 220 would display information related to the personalized individual community hub, such as, but not limited to community events occurring in the area, local news events, businesses that have opened up in which the customer might be interested, recent reviews of businesses, etc. as will be discussed in further detail later.

If the customer selects the set-up link 222, the customer will be directed to the individual community hub application interface 300, which in one embodiment is displayed through the online banking application 20, as illustrated in FIG. 3. In one embodiment of the invention, a community hub tab 302 is created in the individual service section 204 and the individual customer 6 is directed to the my community account tab 304 in the individual service sub-section 206 to set up the customer's individual community hub. As illustrated in block 104 of FIG. 2A the my community account interface allows the individual customer 6 to enter in a community location that the individual customer 6 wants to join. Each individual customer 6 can join a community that is grouped, in one embodiment, in a geographical area based on the geographical boundaries set-up by the bank for each local community. In other embodiments of the invention the local community can be grouped according to other identifiers outside of the geographic location, such as but not limited to similar purchasing habits, industries in which the customer is interested, customer demographic information such as, for example, customer age, etc. In one embodiment of the invention, the my community account tab 304 includes a community location input 306 section, wherein the customer enters her address, zip code, city, street, town, region, area code, and/or the like into the individual community hub application interface 300, in order to join a particular local community. In some embodiments of the invention, the bank will automatically determine the individual's local community by utilizing the location information and transaction information that the bank has as a result of the individual being a customer of the bank. For example, the bank may automatically determine a local community by determining that the individual makes some predefined percentage of her bank card purchases within a certain geographic area or based on the home address of the individual customer 6.

In one embodiment of the invention, the individual customer 6 determines what types of businesses, events, and activities in the customer's local community the individual customer 6 wants displayed in the my community hub 402 tab, as illustrated in block 108 of FIG. 2A. For example, as illustrated in FIG. 3, in one embodiment of the invention, there are three sections: the events section 310, the business section 320, and the activity section 330. The events section 310 comprises a list of events that are occurring in the local community that the individual customer 6 selected in the community location input 306 section. As discussed in greater detail later, the events that are displayed to the individual customer 6 for each local community are entered into the community hub by businesses, organizations, or individuals that are customers of the bank or that have bank approval to enter an event.

The business section 320 comprises a list of businesses or organizations that are within the local community that the individual customer 6 selected in the community location input section 306. As discussed in greater detail later, the businesses or organizations that appear in the business section 320 are customers of the bank or are approved by the bank for inclusion in the list of local businesses.

The activities section 330 includes a list of activities in which the customer might be interested. If the customer selects an activity, various events and businesses related to that activity are listed in the customer's my community hub tab 402. As discussed in greater detail later, each business or organization that is registered with the community hub lists a number of activities with which the business or organization is affiliated. Therefore, when an individual customer 6 selects an activity all of the businesses or organizations affiliated with that activity are displayed in the individual customer's my community hub tab 402.

The individual customer 6 selects an event, business, or activity in the my community account tab 304 by checking the selection-box 340 under the add heading column in each section to indicate that the customer 6 wants to add the event, business, or activity to the customer's 6 my community hub tab 402 or my community calendar tab 502, as described in further detail later. Thereafter, the individual customer 6 selects the submit button 308 to enter or update the individual customer's list of events, businesses, and activities that the individual customer 6 wants displayed in the my community hub tab 402.

In other embodiments of the invention the my community hub tab 402 is populated with events, businesses, and activities automatically by the individual community hub application 17. For example, in one embodiment of the invention since the bank has data related to transactions made by the individual customer 6 through the customer's banking accounts, the individual community hub application 17 can use the transaction data to populate the my community hub tab 402 with the businesses, events, and activities in which the individual customer 6 might enjoy, as illustrated by block 110 in FIG. 2A. The businesses, events, and activities are based, at least in part, on the businesses and events the customer transacted with in the past, the types of products or services the customer purchased, or other businesses, events, or products and services that are similar or related to the businesses or events the customer transacted with, or the products and services purchased.

In some embodiments of the invention, the events, businesses, and activities displayed to the individual customer 6 are determined by the individual community hub application 17 for local communities that the individual customer 6 is visiting, based on transactions that the individual customer 6 has made outside of her usual local community.

FIG. 4 illustrates one embodiment of the my community hub interface 400 in the my community hub tab 402. In one embodiment of the invention, the my community hub 400 interface has two sections, the community search section 410, and the community hub results section 430. The community search section 410 allows the individual customer 6 to search and view what events, businesses, and activities are listed in the my community hub tab 402, as illustrated in block 112 of FIG. 2A. In one embodiment, the community search section 410 includes a display drop-down feature 412 that includes categories to display in the community hub results section 430. For example, the display drop-down feature 412 could include categories for all businesses, all events, all activities, businesses purchases (i.e. businesses from which the customer has purchased products or services), past events attended, activity categories, selected businesses, events, and activities, which provide personalized results for each individual customer 6. The individual customer 6 selects any one of the categories in order to indicate what events/offers, businesses, or activities the individual customer 6 wants displayed in the community hub results section 430. For example, if the individual customer 6 selects the "all" category, she can view all of the results related to the businesses, events, and activities that the individual customer 6 selected from the my community account tab 304.

In one embodiment, there is also a search section 414 in the community search section 410. The search section 414 allows a customer 6 to select in the search category section 416 categories, such as the date, business, activity, event, offer, type, all sections, etc. of the community hub and enter keywords into the search terms section 418. When the customer 6 selects the search button 422 the individual community hub application 27 will search for terms in the categories selected and display the results in the community hub results section 430.

As illustrated in block 114 of FIG. 2A, the individual community hub application 17 will generate one or more businesses, events/offers, or activities in which the customer may be interested based on the information supplied by the my community account interface and/or the transaction data related to the individual customer 6 from the individual customer's accounts as the bank.

After generating a list of businesses, events/offers, or activities for the individual customer 6 the individual community hub application 17 will display the them to the individual customer 6 based on the information the individual customer provided in the community hub search section 410, as illustrated in block 116 of FIG. 2A. The community hub application displays the results related to the selected category, search criteria, and/or individual customer 6 preferences (i.e. customer transactions and/or business, event/offer, and activity selections) in the community hub results section 430.

The community hub results section 430 displays the business 434 and/or events 438 along with the associated activity 436, date 432, any related offers 440, the type 442, and any reviews 444 of the business or event. The community hub results section 430 is sortable by the date of the event or offer, alphabetically by business name, activity name, event name, type name, by the score of the reviews, and/or the like.

In one embodiment of the invention the list of businesses in the community hub results section are sortable based on the customer's transaction information and/or other factors. In one embodiment, the other factors include, an annual, monthly, weekly, daily, hourly, or per display amount that the bank assesses the businesses to be displayed to the individual customer 6 or included in the business community hub. The actual amount could be tied to the number of times the business is selected for viewing, the number of times it is displayed, and/or the number of times that a customer purchases something from the business after the customer 6 selects the business, event, or offer to view.

In some embodiments for example, the lists of businesses or events displayed in the results section 430 could be based, in part, on the businesses or events that are frequented by the individual customer 6, which can be determined by the bank based on the transactions the individual customer 6 has made through the bank using the accounts the individual customer 6 has with the bank. Other lists of businesses or events provide other local businesses not frequented by the individual customer 6, but that may be of interest to the customer based on the individual customer's past transactions. For example, if a customer makes a lot of transactions at sports-related stores, the community hub application 17 can display, at the top of the results section 430, other sports stores or related businesses in the individual customer's local community. Local businesses may also be categorized by product type so that a customer can quickly find local businesses that provide products or services of a particular type. Other local information, such as events, discounts, etc. may also be provided.

In one embodiment of the invention, the individual customer 6 can select the link to the business 434, event 438, offer 440, and/or review score 444 to view each in more detail. For example, selecting the business in some embodiments brings the customer 6 to the business' website. In other embodiments, selecting the link to the event 438 or offer 440 takes the individual customer 6 to a page that describes each specific event or offer in more detail. In one embodiment, the customer can select the link to the review score 444 to view the various reviews that customers of the bank had for each business 434 or event 438, which is described in more detail later.

In one embodiment, for example, by selecting a specific offer for a specific business, the customer is routed to an offer page that provides the customer with a coupon, website code, and/or the like that the customer 6 can print out or enter into a website, which provides the individual customer 6 with a discount when purchasing something from the business or when attending an event.

In other embodiments of the invention the customer may select certain events or offers in the community hub results section 430 and add them to a calendar showing the various events, and dates or date ranges during which specific offers are valid, as illustrated by block 118 in FIG. 2A. An example of one embodiment of the calendar is illustrated in FIG. 5. After selecting an event 438 or an offer 440 to add to a calendar, the individual customer 6 can view the calendar by selecting the my community calendar tab 502. FIG. 5, illustrates one embodiment of the community calendar interface 500. The calendar lists the days in a month 504 and the associated events or offers for each of the days. The calendar also lists and the months in a year in the month tab section 506. The individual customer 6 views the events 438 and offers 440 that the customer selected for any day or month of the year. The individual customer 6 also can select the event or offer illustrated in the calendar and is routed to another tab or page that displays more details related to the particular event or offer. In other embodiments of the invention the individual customer 6 may select a day on the calendar and be routed to another screen that shows all of the events and offers for the day selected. The individual customer 6 can also change the month by selecting another month on the month tab section 506. Furthermore, the individual customer 6 can select a particular date, in order to view the events or offers for that date, in the select day section 508.

In some embodiments of the invention the individual customer 6 can select an event or offer in which the individual customer 6 is interested. After selecting the event or offer the individual customer 6 can output the event or offer to an e-mail account or external calendar. The individual customer 6 can send the business offer or event to others through the e-mail account or can store the event or offer in an external calendar (i.e. Microsoft Outlook).

In some embodiments of the invention the individual community hub interface 300 includes an individual community hub forum tab. The community hub forum allows individual customers 6 as well as business customers 8 to post information related to questions, local community announcements, links to local news stories, advertisements for the local businesses, charitable information related to local charities, etc. on the forum page in order to create better relationships throughout the local community. For example, the when the bank is investing in a local charity the bank can post a link to an article about the charity or solicit donations over the forum, so the individual customers 6 and business customers 8 are aware of the investment the bank is making in the local community. Furthermore, the individual customers 6 and business customers 8 can comment on the statements made in the open forum to answer questions, or post more information about businesses or events. The forum page unlike other public forum pages is only open to customers at the bank who have accounts with the bank. Therefore, unlike public forums the individual customers 6 and business customers 8 are regulated by the bank and thus the content displayed in the forum is more likely to be constructive than other public forum pages.

The local community hub fosters better local community relationships between the individual customers 6, the business customers 8, as well as the bank, because each can make the others aware of businesses or events in the local community through the community hub. The local community hub can serve as a mechanism to interact with other individual customers 6, business customers 8, and the bank in the local community and to promote community businesses and events. Furthermore, there is added value in the community hub reviews and forums because the comments about the particular businesses or events in the community can provide incentives for the businesses and events to improve their products and services, and also provide individual customers 6 and business customers 8 with constructive comments about the businesses and events, which helps make their decision to use the business' products or services, or participate in the events more informed.

FIG. 6A illustrates a business community hub set-up and implementation process 130, in accordance with one embodiment of the present invention. The business customer 8 begins the process of setting up the community hub by first logging into the online banking application 20, which authenticates that the business customer 8 is the correct customer and provides access to the business customer's online banking account, as illustrated in block 132 of FIG. 2A.

FIG. 6B illustrates a business online banking home page 600, in accordance with one embodiment of the present invention. In the illustrated example embodiment, the business online banking home page 600, has four sections, the business tabs section 602, the bank account overview section 610, a business community hub section 620 and a business customer service section 630. The business tabs section 602 allows the customer to navigate through various tabs in the business service section 604 of the online banking application 20 such as, but not limited to, the business customer's accounts, bill pay, transfers, investments, and customer service. Customers can also navigate through various tabs in the business service sub-sections 606 of each of the tabs in the business service section 604. For example, as illustrated under the account tab, the business service sub-section 606 includes sub-section tabs for, but not limited to, accounts overview, account details, my portfolio, alerts, and open-an-account.

The business bank account overview section 610 includes a link and summary of the account balances for a business checking account 612, business savings account 614, and any corporate credit card accounts 616 serviced through or tracked by the bank. The customer service section 630 includes various links to account management, service guidelines, help information, etc.

In one embodiment of the invention, as illustrated in FIG. 6B, the online banking home page 600 includes a business hub section 620. In this embodiment, the business hub section 620 includes a set-up link 622 that allows a business customer 8 to set-up the business' personalized local community hub, if the business has not already done so. As illustrated in block 134 of FIG. 6A, the business customer 6 can select the set-up link 622 if the business customer 8 is interested in setting up a community hub. In other embodiments of the invention, if the business has already set-up its business community hub, then the business hub section 620 would display information related to the business' personalized local community hub, such as, but not limited to community events occurring in the area, local news events, other businesses in which the business might be interested, customer reviews of the business or other businesses, market information gathered from the bank's transaction information, and/or the like, as will be discussed in further detail later.

If the business customer 8 selects the set up business community hub link 622, the customer is directed to the business community hub application interface 700, which in one embodiment is displayed through the online banking application 20, as illustrated in FIG. 7. In one embodiment of the invention, a community hub tab 702 is created in the business services section 604 and the business customer 8 is directed to the business community account tab 704 in the business service sub-section 606 to set-up the customer's business community hub. As illustrated in block 136 of FIG. 6A the business community account interface allows the business customer 8 to enter in a community location that the business customer 8 wants to join. Each local community can be grouped in a geographical area that businesses can join based on the geographical boundaries set up by the bank for each community. In other embodiments of the invention, the local community is grouped in other ways besides geographical areas, such as but not limited to the industries in which the businesses operate, supplier or distributor groups, similar purchasing transactions, demographic information (i.e. age, size, employees, etc. of the business), and/or the like. In one embodiment of the invention, the business community account tab 704 includes a community location input 706 section, wherein the business customer 8 determines the local community to join by entering the business' address, zip code, city, street, town, state, region, country, area code, and/or the like into the business community hub application interface 700. In some embodiments of the invention, the business customers 8 may have multiple locations, so they will be able to enter in multiple locations, in order to join multiple local community hubs. In some embodiments of the invention, the bank will automatically determine the business' local community by utilizing the location information and/or transaction information that the bank has as a result of the business being a customer of the bank. For example, the business community hub application may be configured to determine the business' local community based on the geographic location where some predefined percentage of customers make financial transactions with the business and/or on the geographic location where some predefined percentage of the business' financial transactions with suppliers and vendors occur. In other embodiments of the invention the business' local community is determined automatically by the bank based on the business' address.

In one embodiment of the invention, after the business customer 8 enters the location information in the business location input section 706 or location information is automatically determined, the business customer 8 can enter the business information into the business information section 710, as illustrated in block 138 of FIG. 6A. The business information section 710 includes, in some embodiments, the name 712 of the business, the address 714 of the business, and a website link 716 to the business' website.

In one embodiment of the invention, as illustrated in FIG. 7, the business community account tab 704 includes an "add event/offer" section 720 so the business can add a business event or offer to the community hub to display to other businesses or individual customers 6, as illustrated in block 140 of FIG. 6A. In one embodiment the business customer 8 enters the information about the event or offer, such as but not limited to the title 722, description 724, website or offer link 726, activity 728, event 730, offer 732, upload 734, type 736, and/or customer destination 738 sections. The title section 722 is for listing a short description of the event or offer. The description section 724 is for listing a longer description of the event or offer. The activity section 728 allows the business customer 8 to classify the event or offer into a category (e.g. sporting event, cooking, exercising, construction, etc.) so an individual customer 6 or a business customer 8 is able to search for the event or offer by activity type. The event section 730 allows a business customer 8 to enter the name of an event so an individual customer 6 or a business customer 8 can search for businesses or events by name. The offer section 732 provides the business customer 8 the ability to enter a specific offer (i.e. discount, advertisement, sale, coupon, promotion, and/or the like) to individuals or customers tied to the business or an event. The link section 726 provides the business customer 8 the ability to attach a link to the business or event for a particular website or location on the website for the event or offer, which has additional information and/or discounts in the form of a coupon, discount code, or other type of printable or electronic discount. The upload section 734 allows a business customer 8 to upload a coupon, flyer, admission ticket or some other document to the event or business to provide the individual customer 6 or business customer 8 with additional information. The type section 736 allows the business customer 8 to enter the type of offer or event such as, but not limited to a clothing sale, restaurant discount, etc. so the individual customer 6 or business customer 8 can search for a particular event or offer by type. The customer destination section 738 allows the business customer 8 to direct the event or offer to various groups within the business or individual community hub. For example, in one embodiment, the event or offer is directed to specific individuals or businesses that are determined by the bank based on the customer information the bank has about each of their individual customers 6 or business customers 8. In other embodiments, the event or offer is directed to a specific group of customers in a community, such as individual customers 6 or business customers 8 in one zip code and not another. After the Add Event/Offer section 720 information is entered the business customer 8 selects the submit button 740 and the event or offer is posted in the community hub to the individual customers 6 or business customers 8 who meet the requirements entered in the customer designation section 738 of the specific event or offer.

In some embodiments of the invention the business customer 8 can select businesses and offer/events in which the business customer 8 might be interested in much the same way as described previously for an individual customer 6 with respect to FIGS. 3 and 4. For example the business customer can select activities, offers/events, or businesses in which the business customer might be interested from a list in an interface in the business community hub. In other embodiments the activities, offers/events, or businesses in which the business customer 8 might be interested is determined by the business community hub application 27 based on the transactions the business customer 8 has made in the past. In some embodiments of the invention, the activities, offers/events, or businesses in which the business customer 8 might be interested are determined based on the both selections by the business customer 8 as well as past transaction information.

The business customer 8 uses the business community hub interface 800 to view the lists of events or offers from other business, as illustrated in the business community hub tab 802 in FIG. 8. The business community hub tab 802 includes a business search section 810 and a business display section 830. The business customer 8 uses the business search section 810 to determine what businesses or events/offers the business customer 8 wants to view in the business display section, as illustrated in block 142 of FIG. 6A.

The business search section 810 includes a display drop-down feature 812 that includes categories to display in the community hub results section 430. For example, the display drop-down feature 812 could include categories for all businesses, all events, all activities, businesses purchases (i.e. other business with which the business has purchased products or services from), events attended, activity categories, which provide personalized results for each business customer 8. The business search section 810 also includes a search categories section 814 and a terms section 816. The search categories section 814 allows a customer to search all of the businesses, events, and offers by the date 832, business 834, activity 836, event 838, offer 840, type 842, and/or reviews 844. After selecting the search categories the business customer 8 enters keywords into the terms section 816 and selects the submit button 822 to search the community hub.

As illustrated in block 144 of FIG. 6A, the business community hub application 27 will generate one or more businesses to display to the business customer 8 based on the information provided by the business customer 8 or by the transactions the business customer 8 has made in the past. The results of the business customer's search are displayed in the business display section 830 based on the information the business customer 8 entered into the search section 810, as illustrated by block 146 in FIG. 6A.

The business display section 830 includes the same or similar entries as they are shown in the my community hub tab 402, but are now generally directed to events and offers for a business. Since there is overlap between events and offers for both businesses and individual customers 6 some events or offers will be directed to both individual customers 6 and business customers 8. As was the case with the display section 430 in the my community tab 402 the date 832, business 834, activity 836, event 838, offer 840, type 842, and/or reviews 844 in the business display section 830 can be sorted and searched as they were in the display section 430.

As previously discussed with respect to the individual community hub application 17, the business community hub tab 802 can be populated with events, businesses, and activities automatically in the same or similar way as described for the my community hub tab 402. The businesses, events, and activities displayed can be based, at least in part, on the other businesses and events the business has transacted with in the past, the types of products or services the business has purchased, or additional businesses, events, or products and services that are similar or related to the other businesses or events the business transacted with, or the products and services purchased.

As previously discussed with respect to the individual community hub application 17, in some embodiments of the invention, the business customer 8 can select an event or offer in which the business customer 8 is interested. After selecting the event or offer the business customer 8 can output the event or offer to an e-mail account or external calendar. The business customer 8 can send the business offer or event to others through the e-mail account or can store the event or offer in an external calendar (i.e. Microsoft Outlook).

FIG. 9A illustrates a business contact process 170, in accordance with one embodiment of the present invention. The business contact process 170 outlines how a business customer 8 uses the business community hub application 27 to identify, add, and contact local businesses to help develop and grow business relationships.

FIG. 9B illustrates one embodiment of the invention for a business community contacts interface 900. A business customer 8 views the business community contacts interface 900 by selecting the business community contact tab 902. The business community contacts interface 900, in one embodiment of the invention, includes the business name 904 that is logged into the business community hub. In one embodiment of the invention, the business community contacts interface 900 also includes a contact list section 910 and a search contacts section 930. The contacts list section 910 displays the other businesses who are already listed as contacts with the current business logged into the community hub. The contacts are listed by business 912, type 914, community location 916, business description 918, contact name 920, and contact number/e-mail 922. The contact list provides a group of businesses that my be affiliated with the business customer 8, as suppliers, distributors, manufactures, investors, financiers, legal services, charitable partners or any other type of business affiliate. The business community contacts interface 900 brings businesses in a specific local community location into contact with one another to help grow the involvement of businesses with each other in a local community.

As illustrated in block 172 of FIG. 9A the business customer 8 uses the search contacts section 930 to identify a list of contacts in which the business customer 8 might be interested. The search contacts section 930 has a contact category drop-down section 932 and a contact search terms section 934 that allows the business customer 8 to search for business contacts in the business customer's local community hub. The contact category drop-down section 932, in one embodiment, includes categories to search, such as, but not limited to, the business, type, location, description, all fields, etc. The business customer 8 enters keywords into the search terms section 934 and selects the submit button 936 to search for contacts.

As illustrated in block 174 of FIG. 9A the business community hub application 27 takes the query from the business customer 8 and uses it to generate a list of businesses that match the business customer's query. In some embodiments of the invention the business community hub application 27 can use the business customer's business information and/or transaction details alone or in combination with the business customer's query to identify contacts in which the business customer 8 might be interested.

After generating the contacts the business community hub application 27 displays the contacts to the business customer 8 as illustrated by block 176 in FIG. 9A. The contacts from the search are displayed in the results section 940 and are sorted in one embodiment by business 942, type 944, location 946, and business description 948. As illustrated by block 178 the customer can add contacts identified by the business community hub application 27 to the business customer's contact list. In one embodiment contacts are added through an add contact column 950 that allows a customer to add a business to its contacts list by selecting the add contact button 952 in the add contact column 950. In one embodiment of the invention the search contact section 930 does not include the contact name and contact number for the business because the business may not want unsolicited inquires. Therefore, the add contact button 952 allows a business to screen who is trying to add them as a contact before they accept.

After the business customer 8 adds a contact, the business community hub application 27 sends a contact request to the contact as illustrated by block 180 in FIG. 9A. If the contact accepts the contact request the business community hub application 27 adds the contact to the business customer's contact list and adds the business customer 8 to the contact's contact list, as illustrated by block 182.

Once the contact accepts a contact request, the businesses will be able to see the contact's information. As illustrated in block 184 of FIG. 9A the business customer 8 can communicate with the businesses in the business customer's contact list through the business community hub. In one embodiment this allows the businesses in the local community to interact and to begin to foster relationships that may be potentially mutually beneficial to the businesses. Businesses within the local community may take on joint ventures, they may be able to become suppliers or distributors for one another, they may be able to reduce costs by working together, they may be able to find contacts to help grow the business or answer legal, tax, or business questions, etc. For example, in some embodiments of the invention, the business community hub can help make connections between businesses and investors, attorneys, etc. to help grow and sustain the businesses. Furthermore, the bank can provide the businesses with the answers and information related to how to open and grow a small business, receive credit or financing for the business, receive financial planning services for the business, apply for government aid, etc. The information can be provided directly through the contact information or over a business community hub forum.

In other embodiments of the invention the business community hub interface 700 will have a business community hub forum like the individual community hub forum described previously. In the business community hub forum, businesses are able to post questions, comments, advertisements, or other information for other businesses to see and respond. The business community hub forums allow businesses to solicit and find information from other businesses within the local community that may be able to help develop and grow the businesses in the local community.

In some embodiments of the invention the business community hub and/or the business community hub forums are not limited to businesses within a local geographic community. In some embodiments of the invention, in order to provide the necessary networking opportunities, businesses from one local community may need to communicate with other like businesses outside of the local community. In this way, in some embodiments of the invention, the businesses within one local community hub may be able to make contacts with or have discussions on forums with other related businesses outside of the business' local community hub.

In some embodiments of the invention the businesses community hub also provides community-wide transaction information relevant to each of the businesses in the community hub. For example, the business community hub may compare the sales processed by the bank for the individual business versus sales by other local competitors. These other local competitors may not use financial services or products from the bank, but the bank may still have purchase data about the competitors by way of transaction data from bank consumers that make transactions with the competitors through accounts at the bank. In this way, the community hub in the online banking system 20 could also be a business tool for local businesses in analyzing market conditions in the local community. The bank can provide information, graphs, charts, etc. about business market data in the local community, such as market share, comparative sales, etc. This data can be business specific or industry specific.

FIG. 9C illustrates one embodiment of a market research process 190 for the business community hub application 27, in accordance with one embodiment of the invention. As illustrated in block 192 in FIG. 9C, the business community hub application 27 receives a request from a business customer 8 related to a chart type and date ranges for the chart type that the business customer 8 is interested in viewing. The business community hub application 27 determines the extent of the market data that can be displayed to the business community hub application based on privacy laws and agreements that the bank may have with various customers that use products and services from the bank, as illustrated in block 194. The business community hub application 27 then generates the market data to display to the business customer 8, as illustrated in block 196. In some embodiments of the invention, the data the bank uses to determine and generate the market data comes from the transactions made by customers at the bank at various businesses or from the businesses themselves who utilize the bank's products and/or services. The large banks are uniquely positioned to gather and determine market research data because they have the ability capture information related to transactions on both sides of the transactions (i.e. through the customer making a purchase or the business accepting a purchase). Furthermore, the banks also have the ability to access accounts outside of the bank if the customers allow the bank to access the customer's records at other institutions (i.e. online banking accounts) or the bank has relationships with other financial institutions directly.

In some cases the bank will not be able to capture any or accurate market data for businesses that do not use products or services at the bank, or for businesses at which the bank's customers do not enter into transactions. Therefore, in other embodiments of the invention, the bank utilizes market research data or algorithms to fill in or determine market data. Larger banks have a greater ability to capture and use transaction data because of the large customer base that these types of banks support. In some embodiments of the invention, the bank utilizes the market research data or algorithms alone or in combination with the transaction information that the bank already stores with respect to the transactions that the bank's customers make.

As illustrated in block 198 of FIG. 9C the business community hub application 27 displays the market information to the customer in the form that the customer selected. The market information is displayed to the business customer 8 in a variety of ways such as a market data histogram chart, as illustrated in FIG. 9D. FIG. 9D illustrates one embodiments of a market data interface 960 through the business community market data tab 962. As illustrated in FIG. 9D the market data interface comprises a market data type selection area 970 that has a chart type selection 972 and a start date 974 and end date 976 selection area. The market type selection area 970 allows the business customer 8 to enter in the type of data and the date ranges that the business customer 8 wants to analyze. The business community hub application 27 displays the output of the business customer's input into the selection area 970 in the results section 980 of the market data interface 960 based on the transaction information, market data from other sources, or algorithms that help determine market data. In the example in FIG. 9D, the business community hub application is displaying sales based market share for a number of businesses that are in the same industry as the business. In other embodiments of the invention the market data interface 960 displays other types of market data, such as but not limited to sales based on geographic locations, sales price changes over time for the same products, repeat customer sales figures, if customers switch products what businesses do they switch to, etc.

In other embodiments of the invention the business community hub application 27 has a business community calendar tab for a business community calendar. The business community calendar would look like the my community calendar interface 500 described above for the individual customer 6, however, the business community calendar would be tailored for business offers and events that relate to the business customer 8.

In some embodiments of the invention individual customer 6 may live in multiple areas and business customers 8 may have businesses in multiple local communities. In these cases the community hub application may allow the individual customers 6 and business customers 8 to belong to multiple local community hubs.

FIG. 10A illustrates a business review and review contact process 1070 that outlines the process of reviewing a business and identifying review contacts in the business review application 28, in accordance with one embodiment of the invention. As illustrated in FIG. 10B, one embodiment of the community hub application includes a review application 28 with a review interface 1000 accessible through the my community reviews tab 1002. The my community reviews tab 1002 has sub-section tabs for a review account 1102 and reviews 1004. In some embodiments of the invention the review application 28 can be tailored specifically for the individual community hub application 17 and the business community hub application 27 separately, or in other embodiments, the review application 28 can be used by both the individual community hub application 17 and the business community hub application 27. Therefore, in some embodiments of the invention, both the individual customers 6 and the business customers 8 (collectively "customer" or "customers") can access the same review application 28 or can access separate review applications 28 that are specific to individual customers 6 and business customer 8 separately.

The customer can access the review interface 1000 illustrated in FIG. 10B, by selecting the my community review tab 1002 and the sub-section review tab 1004. Alternatively, in one embodiment when a customer selects a review score link in the community hub the customer is taken to the review interface's review tab 1004, as illustrated by block 1072 in FIG. 10A. The review interface 1000 has a review section 1010 and an add/edit review section 1050. After selecting a review link in the community hub the customer is taken to the review tab 1004 for the business the customer selected. The review section 1010 displays the business name 1012 that relates to the review the customer selected, as well as the average review score 1014 for the business. Alternatively, if the customer viewed the review interface 1000 by selecting the my community review tab 1002 the customer can search for a particular business to review by typing the name of the business in the business name section 1012.

In some embodiments of the invention, the review section 1010 will also have a certification section 1016. The certification section is a score or indication that the business for which the reviews are related is certified by the bank (e.g. business can be rated similarly to how bonds for companies are rated, on a scale from 1 to 5, on a high-low scale, or other rating systems). The bank has the financial information of the businesses that are part of the community hub. Therefore, the bank has the necessary information to rate or certify the businesses based on their financial security, such as but not limited to ability to pay bills, capital, debt, etc. While some businesses could decide not to use the community hub, some businesses will see it as a positive that they are being identified to customers as financially stable. Customers will also find it helpful that they know the business that they are dealing with is financially stable. Furthermore, the rating or certification system provides businesses with an incentive to be fiscally responsible with their accounts at the bank because otherwise the businesses could lose customers over the community hub if the bank does not rate them favorably.

The customer review section 1020 illustrates all the reviews that have been made by customers for the particular business selected by the customer 6. The customer review section 1020 has a section for the date 1022, the reviewer 1024 who made the review, the score 1026 the reviewer gave, the description 1028 the reviewer gave, and an add contact 1030 column for adding the person making the review to the customer's contact list, which is explained in greater detail later. The customer 6 can look at all the reviews for the particular business to see how individual reviewers felt about the business or how the scores have changed over time. For example, the business might have a low average score 1014 because the business is relatively new and the initial reviews were poor; however the more recent reviews had much higher scores. The customer 6 can organize the reviews based on the date 1022, alphabetically by the reviewer 1024, decreasing or ascending reviewer score 1026, etc.

The add/edit review section 1050 allows a customer to enter a review of the business or event, or edit an older review of the same business or event. The customer enters the review date 1052, the review score 1054, and a review description 1056 of the business or event, as illustrated by block 1074 in FIG. 10A. The customer then selects the submit button 1058 to submit the review or edited review to the community hub for publication, as illustrated in block 1076. In some embodiments of the invention the bank will only allow customer's who have accounts at the bank to make reviews in the community hub. In such an embodiment, the customer may be made to log into online banking before submitting a review or is made to use the same authentication procedures used for online banking to log the person into the business review application. In this way, the community hub business review section may have additional creditability as to the accuracy of the ratings and reviews since the person must authenticate themselves before submitting a review. For example, in one embodiment, the online banking authentication procedures that are also used to access the business review section require a user ID (identification) code, a password, one or more security questions, a cookie on the user's computer, and/or the like.

In some embodiments of the invention the customer may only review a business in a particular local community once and this can be enforced in embodiments where the person must authenticate themselves using the online banking authentication procedures. This provides the community hub review section with some further creditability as to the accuracy of the scores of the review since customers can only review a business once and cannot post multiple reviews. This prevents customers who have connections to a particular business or a problem with a particular business for whatever reason, from skewing the results of the reviews abnormally high or low by submitting multiple negative or positive reviews. For example, if a customer works for a competitor they can only post a review for the particular business once and is thus prevented from posting multiple negative reviews for the sole purpose of bringing down the average score for the business or event.

In some embodiments of the invention, customers are only allowed to post a review in the community hub if the customer 6 has made a transaction, such as a purchase or a return using the customer's bank card, with a particular business within a certain time period, for example the last 6 months. This also can be enforced in embodiments where the user must authenticate her identity using the bank's robust online banking authentication procedures prior to accessing the business review section. This prevents anyone who has not had any transactional interaction with the business from posting a review. These embodiments provide for a better reviewing system, which can only be achieved with the resources of a bank since other review sites do not have the ability to track the transactions and prevent customers from making multiple review posts using fake account names. In order to have multiple names for submitting reviews, the customer would have to open multiple accounts at the bank under multiple names. The bank could also eliminate skewed ratings by preventing businesses and/or individual customers 6 who work for the businesses to rate their own businesses.

Other than submitting a review of a business, the customer can also identify contacts and read reviews of those contacts, as further illustrated in the business review process 1070 of FIG. 10A. In some embodiments of the invention, if the customer selects the add contact button 1032 in the add contact column 1030 of the customer review section 1020 the customer is directed to the customer the account interface 1100 in the account sub-section tab 1102, as illustrated in FIG. 11. In other embodiments of the invention, the customer can view the account interface 1100 by selecting the account sub-section tab 1102. The add contact button 1032 is used to add a contact to the customer's contact list 1130. The account interface 1100 allows the customer to be alerted to reviews associated with the contacts in the customer's contact list 1130, and in some embodiments, allows the customer to communicate with the contacts through e-mail or other messaging service. The account interface 1100 includes the customer's name 1104 illustrating the name of the customer logged into the account in the community hub. The customer name 1104 can be the name of the customer, an alias of the customer for security purposes, or the name of the company the customer is representing. Below the customer name 1104 is an edit profile link 1106 that allows the customer to change the profile information for the customer, such as the customer's name 1104, addresses, website link, etc.

The account interface 1100 includes a search contacts section 1110, a contacts list 1130, and a recent review section 1150. The search contacts section 1110, like the other search features in the community hub, has a search category 1112 feature, and a terms section 1114. The customer can search for contact in the community hub by name, location, businesses reviewed, etc. The results section 1116 of the search contact section 1110 will list the customer name 1118, the local community location 1120, as well as other contact information in other embodiments of the invention. The customer can select the add button 1124 in the add column 1122 to add the contact to the customer's contact list, as illustrated by block 1078 in FIG. 10A. As illustrated in block 1080 of FIG. 10A, if the contact accepts the contact request from the customer, the contact is added to the customer's contact list 1130. Once a contact is added to the contact list, and the contact agrees to become a contact of the customer, the customer is able to see additional information for the contact added. In some embodiments, the customer is able to see the additional contact information for the contact without having the contact agree to become a contact of the customer.

In one embodiment of the invention, the account interface has a contact list 1130, which displays the contacts that the customer has added in the past. In one embodiment of the invention, the contacts list section 1130, displays the contact name 1132, the community hub location 1143, the most recent business or event reviewed 1136 by the contact, the score 1138 for that business or event, and a contact link 1140. The customer can view all of the business reviewed by the contact by selecting the contact name 1132 link, as illustrated by block 1082 in FIG. 10A. In other embodiments of the invention, the customer can read more information about the each of the reviews of the contacts by selecting the link for most recent review 1136. In other embodiments the customer 6 may exchange information directly with the contact, through e-mail or other means, by selecting a contact link 1140.

In one embodiment of the invention the account interface section 1150 includes a recent reviews section 1150. The recent reviews section 1150, list the most recent reviews made by the customer or the customer's contacts. In other embodiments of the invention the recent reviews section displays the most recent reviews made by a contact selected from the contact list 1130, as illustrated in block 1084 of FIG. 10A. In some embodiments the recent reviews section 1150 includes the date 1152, the business name 1154, the score 1156, and the review description 1153.

As illustrated by FIG. 12, in one embodiment of the invention the customer can decide to review businesses directly from the customer's online banking application 20. The customer can select the account details tabs 1202 to review the transactions the customer has made with the accounts the customer has through the bank. The account details tab 1202 displays a transaction interface 1200 that illustrates in the transaction section 1210 the transactions the customer has made. The transaction section 1210 in one embodiment includes the date 1212 the customer made the transaction, a description 1214 of the transaction, the type 1216 of transaction, the status 1218 of the transaction, the amount 1220 of the transaction, the balance 1222 of the customer account used for the transaction, the payee name 1224, and the review score 1226 of the payee. The review score 1226 can list the average score that the business has received from all customers or the score that the customer has previously given to the business. In some embodiments of the invention the transaction section 1210 can list both scores side by side in separate columns. A not rated ("NR") indication in the review score 1226, or other like indicator, lets the customer know that the customer has not yet rated the business.

In some embodiments of the invention, the payee name 1224 or the review score 1226 for that payee is a link that directs the customer to the review interface 1000. In the review interface 1000 the customer can review the business related to the payee name 1224 or the review score 1226 that the customer selected in the transaction interface as previously described. In other embodiments of the invention, a pop-up review window can take the place of or work in conjunction with the review interface 1000 to allow the customer to quickly rate a business in the transaction interface 1200 without having to be directed to a different screen in a different tab in the online banking application 20. The customer can rate the business in the pop-up window and the business review application 28 updates the review scores for that business. In this way the customer can quickly go through all of the businesses that the customer has entered into transactions with and rate each business.

The individual community hub application 17, business community hub application 27, and the review application 28 provide not only individual customers 6 and businesses customers 8 with a link to the local community, but they also provide the bank with a link to the local community. The bank can submit events in the community hubs, and can post messages or advertisements in the forums related to community events they are sponsoring, new products or services that they are providing, charities to which they donate or with whom they are partnered, etc. In this way the bank has the ability to connect with local community customers and provide the customers with information related to how the bank is working towards improving the local community. For example, the bank can provide charitable information through the community hub to their customers related to what organizations the bank and its employees are donating money, time, and banking services to in the local community and/or information related to how customers can help. The bank can also suggest or respond to customers on the forum with financial products or services that the customer might be interested in based on their questions, transaction history, or account information. For example, the bank may be able to suggest to individual customers 6 mortgage information when customers are looking for a new house, or college investment information when they identify based on transaction history that the customer has a child, or they may be able to provide business customers 8 small business financing information for business customers that are looking to start a new venture or expand, etc. In this way the bank has a new channel to interact with customers in a local community to provide information, foster local community relationships, and start to create a more local feel of a community bank.

In some embodiments, the content generated by the community hubs can be displayed in banking center community displays that are located in bank branches and banking centers throughout various local communities. U.S. patent application Ser. No. 12/713,899 to Joa et al., entitled "Banking Center Community Display," and filed concurrently herewith, describes banking center community displays in greater detail and is hereby incorporated by reference in its entirety.

In some embodiments, as previously discussed, the bank or other businesses may advertise through the community hubs. The community hubs may be displayed in banking center community displays and accessed through a card, payment device, authentication means, or other devices by employees of a business to advertise through the community hubs. U.S. patent application Ser. No. 12/714,101 to Joa et al., entitled "Bank Based Advertising System," and filed concurrently herewith, describes a system that authenticates a user as a bank customer and allows the user to use the bank-based communication system to create an advertisement on behalf of an owner of the financial account for which the user was authenticated. The system then presents the advertisement through one or more banking outlets.

U.S. patent application Ser. No. 12/713,624 to Nagarajan et al., entitled "Individual Customer Community Hub," and filed concurrently herewith, describes a bank-based local community hub in greater detail and is hereby incorporated by reference in its entirety.

U.S. patent application Ser. No. 12/713,632 to Nagarajan et al., entitled "Business Customer Community Hub," and filed concurrently herewith, describes a bank-based business community hub in greater detail and is hereby incorporated by reference in its entirety.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A local community hub review system for an online banking system comprising:
   a memory device;
   a communication device; and
   a processing device operatively coupled to the memory device and the communication device, wherein the processing device is configured to execute computer-readable program code to:
   receive authentication information from a customer;
   identify the customer based on the authentication information, wherein identifying the customer associates at least one financial account with the customer;
   receive transaction data for transactions conducted by the customer using the financial account;
   receive input from a customer related to a business or event the customer wants to review;
   determine whether the customer has completed a transaction at the business or event based on the transaction data;
   access from a community hub the reviews of the business or event;
   display on a community hub interface the reviews of the business or event;
   receive input from a customer for assigning a review score associated with the business or event the customer wants to review; and
   assign the review score to the business or event when the transaction data confirms that the customer has previously conducted a transaction at the business or event.

2. The local community hub review system of claim 1, wherein the processing device is further configured to execute computer-readable program code to assign the review score to the business or event only when the transaction occurred within a predetermined amount of time of the system receiving the input.

3. The local community hub review system of claim 1, wherein the processing device is further configured to execute computer-readable program code to only allow a customer to assign a score if the customer is not affiliated with the business or event being reviewed.

4. The local community hub review system of claim 1, wherein the processing device is further configured to execute computer-readable program code to calculate an average review score for the business or event based at least in part on the review score assigned by the customer and the review scores of other customers of the business or event.

5. The local community hub review system of claim 1, wherein the processing device is further configured to execute computer-readable program code to receive customer input related to a contact that the customer would like to add to a contacts list of the customer.

6. The local community hub review system of claim 1, wherein the processing device is further configured to execute computer-readable program code to receive customer input related to search criteria for identifying a contact the customer would like to identify, wherein the contact is another customer of a bank that operates the online baking system, and wherein the contact is a part of the community hub.

7. The local community hub review system of claim 1, wherein the processing device is further configured to execute computer-readable program code to receive customer input related to a contact in a contacts list of the customer; and to display in a review interface one or more businesses or events in the local community that the contact has reviewed.

8. The local community hub review system of claim 1, wherein the processing device is further configured to execute computer-readable program code to determine a certification status of the business in the community hub, wherein the business is a bank customer, wherein the bank controls the online banking system, and wherein the certification status of the business is based on the financial information the bank has regarding the business.

9. The local community hub review system of claim 1, wherein the processing device is further configured to execute computer-readable program code to display the community hub interface in a separate window from the interface the customer is viewing.

10. A computer program product for a local community hub review system for an online banking system, the computer program product comprising at least one non-transitory computer-readable medium having computer-readable program code portions embodied therein, the computer-readable program code portions comprising:
  an executable portion configured for receiving authentication information from a customer;
  an executable portion configured for identifying the customer based on the authentication information, wherein identifying the customer associates at least one financial account with the customer;
  an executable portion configured for receiving transaction data for transaction conducted by the customer using the financial account;
  an executable portion configured for receiving input from a customer related to a business or event the customer wants to review;
  an executable portion configured for determining whether the customer has completed a transaction at the business or event based on the transaction data;
  an executable portion configured for accessing from a community hub the reviews of the business or event;
  an executable portion configured for displaying on a community hub interface the reviews of the business or event;
  an executable portion configured for receiving input from a customer for assigning a review score associated with the business or event the customer wants to review; and
  an executable portion configured for assigning the review score to the business or event when the transaction data confirms that the customer has previously conducted a transaction at the business or event.

11. The computer program product of claim 10, further comprising an executable portion configured for assigning the review score to the business or event only when the transaction occurred within a predetermined amount of time of the system receiving the input.

12. The computer program product of claim 10, further comprising an executable portion configured for only allowing a customer to assign a score if the customer is not affiliated with the business or event being reviewed.

13. The computer program product of claim 10, further comprising:
  an executable portion configured for calculating an average review score for the business or event based at least in part on the review score assigned by the customer and the review scores of other customers of the business or event.

14. The computer program product of claim 10, further comprising:
  an executable portion configured for receiving customer input related to a contact that the customer would like to add to a contacts list of the customer.

15. The computer program product of claim 10, further comprising:
  an executable portion configured for receiving customer input related to search criteria for identifying a contact the customer would like to identify, wherein the contact is another customer of a bank that operates the online baking system, and wherein the contact is a part of the community hub.

16. The computer program product of claim 10, further comprising:
  an executable portion configured for receiving customer input related to a contact in a contact list of the customer; and displaying in a review interface one or more businesses or events in the local community that the contact has reviewed.

17. The computer program product of claim 10, further comprising:
  an executable portion configured for determining a certification status of the business in the community hub, wherein the business is a bank customer, wherein the bank controls the online banking system, and wherein the certification status of the business is based on the financial information the bank has regarding the business.

18. The computer program product of claim 10, wherein the executable portion configured for displaying on a community hub interface the reviews of the business or event, is further configured to display the community hub interface in a separate window from the interface the customer is viewing.

19. A local community hub review method for an online banking system, the method comprises:
  receiving authentication information from a customer;
  identifying the customer based on the authentication information, wherein identifying the customer associates at least one financial account with the customer;

receiving transaction data for transactions conducted by the customer using the financial account;

receiving input from a customer related to a business or event the customer wants to review, using a processing device operatively coupled to a memory device, and a communication device, and configured to execute computer-readable program code;

determining whether the customer has completed a transaction at the business or event based on the transaction data;

accessing from a community hub the reviews of the business or event, using the processing device;

displaying on a community hub interface the reviews of the business or event, using the processing device;

receiving input from a customer for assigning a review score associated with the business or event the customer wants to review, using the processing device; and assigning the review score to the business or event when the transaction data confirms that the customer has previously conducted a transaction at the business or event.

20. The method of claim 19, further comprising assigning the review score to the business or event only when the transaction occurred within a predetermined amount of time of the system receiving the input.

21. The method of claim 19, further comprising only allowing a customer to assign a score if the customer is not affiliated with the business or event being reviewed.

22. The method of claim 19, further comprising:
calculating an average review score for the business or event based at least in part on the review score assigned by the customer and the review scores of other customers of the business or event, using the processing device.

23. The method of claim 19, further comprising:
receiving customer input related to a contact that the customer would like to add to a contacts list of the customer, using the processing device.

24. The method of claim 19, further comprising:
receiving customer input related to search criteria for identifying a contact the customer would like to identify, using the processing device, wherein the contact is another customer of a bank that operates the online baking system, and wherein the contact is a part of the community hub.

25. The method of claim 19, further comprising:
receiving customer input related to a contact in a contact list of the customer, using the processing device; and
displaying in a review interface one or more businesses or events in the local community that the contact has reviewed, using the processing device.

26. The method of claim 19, further comprising:
determining a certification status of the business in the community hub, using the processing device, wherein the business is a bank customer, wherein the bank controls the online banking system, and wherein the certification status of the business is based on the financial information the bank has regarding the business.

27. The method of claim 19, wherein displaying on a community hub interface the reviews of the business or event, further comprises displaying the community hub interface in a separate window from the interface the customer is viewing.

* * * * *